United States Patent
Kitagoh et al.

(10) Patent No.: US 12,157,156 B2
(45) Date of Patent: Dec. 3, 2024

(54) CONTROL DEVICE FOR COOLING APPARATUS

(71) Applicant: TOSHIBA MITSUBISHI-ELECTRIC INDUSTRIAL SYSTEMS CORPORATION, Tokyo (JP)

(72) Inventors: Kazutoshi Kitagoh, Tokyo (JP); Hiroyuki Imanari, Tokyo (JP); Naoki Shimoda, Tokyo (JP); Yuki Okano, Tokyo (JP); Sanga Takagi, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 214 days.

(21) Appl. No.: 18/003,348

(22) PCT Filed: Jun. 15, 2021

(86) PCT No.: PCT/JP2021/022632
§ 371 (c)(1),
(2) Date: Dec. 27, 2022

(87) PCT Pub. No.: WO2022/264248
PCT Pub. Date: Dec. 22, 2022

(65) Prior Publication Data
US 2023/0249235 A1  Aug. 10, 2023

(51) Int. Cl.
*B21B 37/74* (2006.01)
(52) U.S. Cl.
CPC .................. *B21B 37/74* (2013.01)
(58) Field of Classification Search
CPC ... B21B 37/74; B21B 38/006; B21B 45/0203; B21B 45/0218
See application file for complete search history.

(56) References Cited

U.S. PATENT DOCUMENTS 6,225,609 B1 * 5/2001 Imanari .................. C21D 9/573
219/486

FOREIGN PATENT DOCUMENTS

JP 2004-34122 A 2/2004

OTHER PUBLICATIONS

International Search Report and Written Opinion mailed on Jul. 13, 2021, received for PCT Application PCT/JP2021/022632, filed on Jun. 15, 2021, 8 pages.

* cited by examiner

*Primary Examiner* — Debra M Sullivan
(74) *Attorney, Agent, or Firm* — XSENSUS LLP

(57) ABSTRACT

In preset calculation, a plurality of cooling banks are set to be feedforward or feedback banks, and each of water injection amounts in these banks is calculated. In cooling history management, a recalculation position for re-executing the feedback calculation is set. In feedback calculation, a temperature correction value for compensating a delay due to a conveyance time period from a position of the feedback bank to a position of a delivery side pyrometer, and a response delay of the feedback bank is calculated, when a segment reaches the recalculation position. In the feedback calculation, each of water injection amounts in the feedback banks that is calculated in the preset calculation is changed for each of segments based on a delivery side temperature target value, a delivery side temperature actual value calculated for each of the segments, a delivery side temperature prediction value that is recalculated, and the temperature correction value.

8 Claims, 13 Drawing Sheets

(i) TIP END SEGMENT REACHES SP (ii) EXECUTION OF FEEDBACK CONTROL (iii) END OF FEEDBACK CONTROL r:TARGET VALUE
y:OUTPUT VALUE
u:INPUT VALUE TO CONTROL TARGET (i) WATER INJECTION AMOUNT IN #N-1 APPROACHES MAX (ii) TRANSFER WATER INJECTION AMOUNT (INCREASE) IN #N-1 TO #h (iii) CHANGE WATER INJECTION AMOUNT IN #N-1

(i) WATER INJECTION AMOUNT IN #N-1 APPROACHES MIN (ii) TRANSFER WATER INJECTION AMOUNT (DECREASE) IN #N-1 TO #h (iii) CHANGE WATER INJECTION AMOUNT IN #N-1

CONTROL DEVICE FOR COOLING APPARATUS

CROSS-REFERENCE TO RELATED APPLICATION

The present application is based on PCT filing PCT/JP2021/022632, filed Jun. 15, 2021, the entire contents of which are incorporated herein by reference.

FIELD

The present invention relates to a device that controls a cooling apparatus that cools a material to be rolled in a rolling line.

BACKGROUND

Quality control in hot rolling incudes size control of products and temperature control of a material to be rolled. Examples of size control include plate thickness control, plate width control, flatness control and the like. Examples of temperature control include finishing mill delivery side temperature control, coiling temperature control and the like. The finishing mill delivery side temperature control is temperature control that controls a temperature of a material to be rolled on a delivery side of the finishing mill. The coiling temperature control is temperature control that controls a temperature of the material to be rolled on an entry side of a coiler.

The coiling temperature control is generally performed by using a plurality of cooling banks provided at a rolling line. The plurality of cooling banks configure one cooling facility as a whole. In the coiling temperature control, for example, preset calculation, feedforward control and feedback control are performed. Hereinafter, for convenience of explanation, feedforward is also referred to as "FF", and feedback is also referred to as "FB".

The preset calculation is performed before start of cooling. In the preset calculation, for example, a control target (target temperature) is given, and each of water injection amounts in the plurality of cooling banks is determined such that the temperature of the material to be rolled after cooling by the cooling facility becomes the target temperature. The FF control is performed by measuring the temperature of the material to be rolled (Hereinafter, also referred to as a "strip") or the like that is a cooling target after start of the cooling operation by the cooling facility. In the FF control, a water injection amount at the time of preset calculation is changed based on the measured actual value, for example. The FB control is performed by measuring the temperature of the strip at the delivery side of the cooling facility. In the FB control, the water injection amount at the time of preset calculation is changed based on the actual temperature value that is measured, for example.

PTL 1 discloses the first embodiment that divides a plurality of cooling banks into water-cooling banks that perform water injection and air-cooling banks that do not perform water injection, and changes a "cooling length" indicating the entire length of the water-cooling banks in the conveyance direction of the strip for each of segments. In the first embodiment, change of the "cooling length" is performed to compensate the change in temperature that occurs due to the deviation between the speed of the strip that is predicted at the time of preset calculation and an actual speed. Note that the segment indicates one section when the strip is divided by a virtual length in the conveyance direction.

In the first embodiment, FB control is performed in some of the water-cooling banks. In the FB control, each of the water injection amounts in the water-cooling banks in which the FB control is performed is changed based on the temperature difference between the actual temperature of the material to be rolled after cooling by the cooing facility and a target temperature. The first embodiment further mentions the compensation function of a dead time due to conveyance of the strip from the position of the water-cooling bank in which the FB control is performed to the position of the delivery side of the cooling facility.

PTL 1 also discloses the second embodiment that assigns some of the water-cooling banks to "cooling banks for FF control" (Hereinafter, also referred to as "FF banks".), and performs FF control of the water injection amounts in the FF banks for each of the segments. In the second embodiment, the above-described temperature difference is calculated at the position that is upstream by the distance corresponding to the dead time of the response delay of the FF banks. In the FF control, the water injection amounts in the FF banks are changed based on the temperature difference. Note that in the second embodiment, explanation of the components common to the components of the first embodiment is omitted. Accordingly, it is conceivable that FB control is also performed in some of the water-cooling banks in the second embodiment. In the second embodiment, the water-cooling banks for which FB control is performed can be said as corresponding to "cooling banks for FB control" (Hereinafter, also referred to as "FB banks".).

CITATION LIST

Patent Literature

[PTL 1] JP 2004-34122 A

SUMMARY

Technical Problem

In the second embodiment of PTL 1, the positions of the FF banks are not specified. In addition, in the second embodiment, it is unclear whether all the water-cooling banks other than the FB banks are FF banks, or some of the water-cooling banks other than the FB banks are FF banks. Thus, the case in which all the water-cooling banks other than the FB banks are FF banks is considered. The case in which the positions of the FF banks are located at the upstream side in the rolling line is considered. In this case, it is expected that the temperature difference is small. Then, the merit of taking the trouble to change the water injection amount at the time of preset calculation at this position is small. Therefore, this time, the case in which the positions of the FF banks are located at the downstream side in the rolling line is considered. However, in this case, there are the following problems from the viewpoint of maintaining the cooling pattern (cooling rule) in the cooling facility.

The cooling pattern has a great influence on the material quality of the strip after cooling by the cooling facility, and therefore is an important factor in cooling of the strip. Examples of the cooling pattern include front-stage cooling and rear-stage cooling. In the front-stage cooling, the water injection amounts in the cooling banks located at the upstream side in the rolling line are large, and the water injection amounts in the cooling banks decrease toward the downstream side in the rolling line. On the contrary, in the rear-stage cooling, the water injection amounts in the cooling banks located at the downstream side in the rolling line are large, and the water injection amounts in the cooling banks decrease toward the upstream side in the rolling line. In the front-stage cooling, the strip in a high-temperature state is rapidly cooled. Therefore, by the front-stage cooling, the material to be rolled may become a material having high strength but difficult to work, though it depends on the chemical composition of the material to be rolled. In the rear-stage cooling, the strip is water-cooled after the temperature of the strip drops. Therefore, by the rear-stage cooling, the material to be rolled becomes a material having strength not so high but easy to work, and having toughness.

The second embodiment in PTL 1 indicates that the front-stage cooling is performed. However, when FF control is performed in the FF banks located at the downstream side in the rolling line when the front-stage cooling is performed, the water injection amounts in the FF banks are increased and thereby the cooling pattern breaks. This problem applies to not only the case in which all the water-cooling banks other than the FB banks are FF banks, but also the case in which some of the water-cooling banks other than the FB banks are the FF banks. In the latter case, this problem is noticeable. This is because in the latter case, water injection is performed separately from the FF banks, the FB banks and the other water-cooling banks. As described above, in order to make the material quality of the strip after cooling by the cooling facility a desired material quality, it is required not to break the cooling pattern. Therefore, it can be said that there are restrictions on changing the water injection amounts in the FF banks. Accordingly, improvement for controlling the actual temperature of the strip on the delivery side of the cooling facility to the target temperature while maintaining the cooling pattern in the FF banks is desired.

One object of the present invention is to provide a technology capable of controlling an actual temperature of a strip on a delivery side of a cooling facility to a target temperature while maintaining a cooling pattern in FF banks.

Solution to Problem

The present invention is a control device for a cooling apparatus that is provided at a rolling line and cools a material to be rolled by a plurality of cooling banks, and has the following feature.

The control device is configured to control each of water injection amounts in the plurality of cooling banks such that a delivery side temperature target value indicating a target temperature of the material to be rolled at a position of a delivery side pyrometer provided at a delivery side of the cooling apparatus corresponds to a delivery side temperature actual value indicating an actual temperature of the material to be rolled that is measured by the delivery side pyrometer.

In the control of each of the water injection amounts in the plurality of cooling banks, the control device is configured to perform preset calculation, cooling history management, feedforward calculation, and feedback calculation.

In the preset calculation, the control device is configured to set each of the plurality of cooling banks to be a feedforward bank for performing feedforward control of the water injection amount, or a feedback bank for performing feedback control of the water injection amount. The feedback bank is at least one cooling bank that is allocated in order from a downstream side in the rolling line according to the material to be rolled, and the feedforward bank is a remaining cooling bank.

In the preset calculation, the control device is further configured to:
  calculate a delivery side temperature prediction value indicating a predicted temperature of the material to be rolled at the position of the delivery side pyrometer; and
  calculate each of the water injection amounts in the plurality of cooling banks such that the delivery side temperature prediction value corresponds to the delivery side temperature target value.

In the cooling history management, the control device is configured to:
  grasp a position of the material to be rolled for each of segments indicating one section at a time of dividing the material to be rolled into a virtual length in a conveyance direction; and
  store a cooling history including an actual speed of the material to be rolled at each of positions of the plurality of cooling banks, and a history of each of the water injection amounts in the plurality of cooling banks, for each of the segments.

In the feedforward calculation, the control device is configured to:
  calculate the delivery side temperature prediction value for each of the segments, based on an entry side temperature actual value indicating an actual temperature of the material to be rolled at a position of an entry side pyrometer provided at an entry side of the cooling apparatus, and a speed of the material to be rolled at the position of the entry side pyrometer; and
  change each of the water injection amounts in the feedforward banks that is calculated in the preset calculation, based on a difference between the delivery side temperature target value, and the delivery side temperature prediction value calculated for each of the segments.

In the feedback calculation, the control device is configured to calculate a difference between the delivery side temperature actual value indicating the actual temperature of the material to be rolled at the position of the delivery side pyrometer and the delivery side temperature target value for each of the segments.

In the cooling history management, the control device is further configured to set a recalculation position for re-executing the feedback calculation. The re-calculation position is located at an upstream side in the rolling line from a position of the feedback bank by a distance corresponding to a response delay of the feedback bank.

When a segment reaches the recalculation position, the control device is further configured to perform, based on the cooling history, recalculation of the delivery side temperature prediction value for the segment that reaches the recalculation position.

In the feedback calculation, the control device is further configured to:
  calculate a temperature correction value for compensating a delay due to a conveyance time period from the position of the feedback bank to the position of the delivery side pyrometer, and a response delay of the feedback bank, when the segment reaches the recalculation position; and
  change each water injection amount of the feedback bank calculated in the preset calculation for each of the segments, based on the delivery side temperature target value, the delivery side temperature actual value calculated for each of the segments, the recalculated delivery side temperature prediction value, and the temperature correction value.

The control device may further have the following feature.

The control device is further configured to perform calculation of a predicted speed of the material to be rolled.

In the recalculation, the control device is configured to:
calculate a temperature drop actual value of the material to be rolled that is conveyed from the position of the entry side pyrometer to the recalculation position for each of the segments, based on the cooling history from the position of the entry side pyrometer to the recalculation position;
calculate a temperature drop prediction value of the material to be rolled from the recalculation position to the position of the delivery side pyrometer for each of the segments, based on the predicted speed, and each of the water injection amounts in the plurality of cooling banks obtained by the preset calculation; and
calculate the delivery side temperature prediction value, based on the temperature drop actual value, and the temperature drop prediction value.

The control device may further have the following feature.

A predetermined cooling pattern is applied to each of the water injection amounts in the feedforward banks.

In the feedforward calculation, the control device is configured to change each of the water injection amounts in the feedforward banks within a range of the predetermined cooling pattern.

The control device may further have the following feature.

A predetermined cooling pattern is applied to each of the water injection amounts in the feedforward banks.

The control device is further configured to:
perform determination of whether or not the water injection amount in the feedback bank approaches a maximum water injection amount or a minimum water injection amount, for each of the feedback banks; and
transfer water injection or stop of water injection in the feedback bank to the feedforward banks within a range of the predetermined cooling pattern, when it is determined that the water injection amount in the feedback bank approaches the maximum water injection amount or the minimum water injection amount.

Effects of Invention

According to the present invention, in the cooling history management, setting of the recalculation position for re-executing the feedback calculation is performed. The recalculation position is located at the upstream side in the rolling line from the position of the feedback bank by the distance corresponding to the response delay of the feedback bank. Further, according to the present invention, the following feedback calculation using the recalculation position is performed. In other words, when the segment reaches the recalculation position, the temperature correction value for compensating the delay due to the conveyance time period from the position of the feedback bank to the position of the delivery side pyrometer, and the response delay of the feedback bank is calculated. Subsequently, each water injection amount in the feedback bank that is calculated in the preset calculation is changed for each of the segments, based on the delivery side temperature target value, the delivery side temperature actual value calculated for each of the segments, the delivery side temperature prediction value that is recalculated, and the temperature correction value.

By considering the delivery side temperature prediction value that is recalculated, in changing each of the water injection amounts, it becomes possible to bring about stability of temperature control to various rolling speeds. In addition, the temperature correction value is considered in changing each of the water injection amounts, and thereby it becomes possible to compensate the delay due to the conveyance time period, and the response delay of the feedback bank. Accordingly, it also becomes possible to enhance stability of the temperature control to various rolling speeds. Accordingly, it becomes possible to control the actual temperature of the segment at the delivery side of the cooling facility to the target temperature.

Further, according to the present invention, feedback banks are allocated in order from the delivery side of the cooling facility. Accordingly, it also becomes possible to observe the cooling pattern in the feedforward banks. Therefore, it becomes possible to control the actual temperature of the segment at the delivery side of the cooling facility to the target temperature while observing the cooling pattern in the feedforward banks.

DESCRIPTION OF EMBODIMENTS

Hereinafter, a control device for a cooling apparatus according to each of embodiments of the present invention is described in detail with reference to the drawings. Note that common elements in the respective drawings are assigned with the same reference signs and redundant explanation is omitted. Further, the present invention is not limited to the following embodiments and can be carried out by being variously modified in the range without departing from the gist of the present invention.

1. First Embodiment

First, a control device according to a first embodiment of the present invention will be described with reference to FIGS. 1 to 8.

1-1. Configuration Example of Rolling Line

Figure 1:
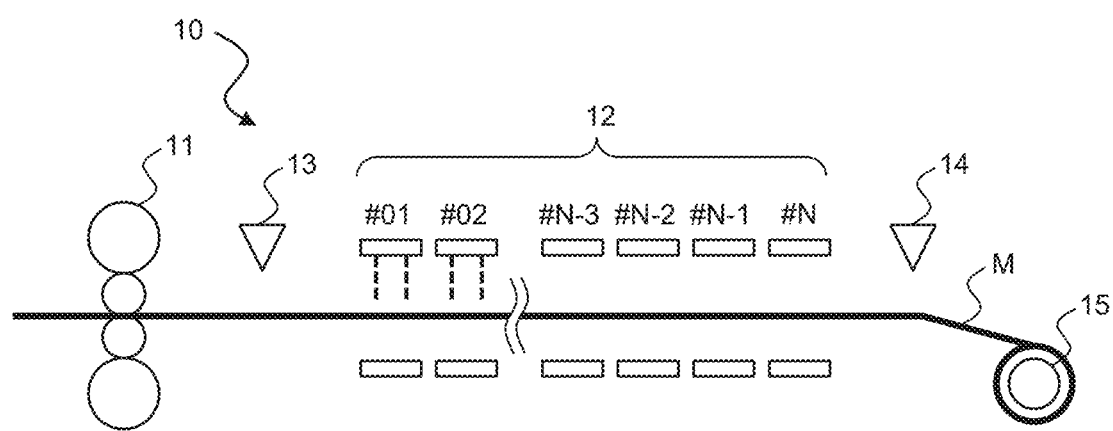
FIG. 1 is a diagram showing a configuration example of a rolling line to which a control device according to a first embodiment of the present invention is applied.

FIG. 1 is a diagram showing a configuration example of a rolling line to which the control device according to the first embodiment is applied. In FIG. 1, the configuration example of the rolling line around a run out table (Hereinafter, also referred to as "ROT".) 10 is drawn. The ROT 10 is a facility for conveying a material to be rolled (namely, a strip M) after rolling by a finishing mill 11 to a coiler 15. In the ROT 10, a cooling facility 12 is provided. The cooling facility 12 has N cooling banks arranged in a conveyance direction of the strip M. Numbers #01 to #N shown in FIG. 1 are for distinguishing these cooling banks, and are assigned in order from an upstream side in the ROT 10. Note that "upstream" and "downstream" in the present application are based on the conveyance direction of the strip M.

Each of the cooling banks includes a plurality of valves that supply cooling water from at least one of a top surface or an undersurface of the strip M. In a certain cooling bank, a water injection amount in the cooling bank is changed by changing the number of valves that are opened. A water injection amount per one valve of the cooling bank at a rear stage (for example, a cooling bank of #02) may be set to a smaller amount as compared with that of a cooling bank at a front stage (for example, a cooling bank of #01). In this case, even if the number of valves that are opened are the same in the cooling banks at the front stage and the rear stage, it is possible to make degrees of cooling different among these cooing banks. Note that a configuration of the valve included by the cooling bank may change the water injection amount by switching an open state and a closed state, or may continuously change the water injection amount by changing an opening degree.

The strip M is conveyed to a right side from a left side in FIG. 1 on the ROT 10. While the strip M is passing through the cooling facility 12, the strip M is cooled to a desired temperature by cooling water supplied from at least one cooling bank. An actual temperature of the strip M is constantly measured in at least an entry side pyrometer 13 and a delivery side pyrometer 14. The entry side pyrometer 13 is a pyrometer installed on an entry side of the cooling facility 12. The delivery side pyrometer 14 is a pyrometer installed on a delivery side of the cooling facility 12. The strip M passing through the cooling facility 12 is coiled by the coiler 15.

The entry side pyrometer 13 is located on a delivery side of the finishing mill 11, and is also called a finishing mill delivery side pyrometer. The delivery side pyrometer 14 is located on an entry side of the coiler 15, and is also called a coiling pyrometer. Hereinafter, for convenience of explanation, a position of the entry side pyrometer 13 is also referred to as a "FDT (Finisher Delivery Thermometer) position". A position of the delivery side pyrometer 14 is also referred to as a "CT (Coiling Thermometer) position".

1-2. Configuration Example of Control Device

The control device according to the first embodiment is typically configured by a computer including at least one processor, at least one memory, and an input/output interface. The control device is connected to a host computer that determines specifications related to rolling such as product plate thickness. A part of functions of the host computer may be included in the control device.

Figure 2:
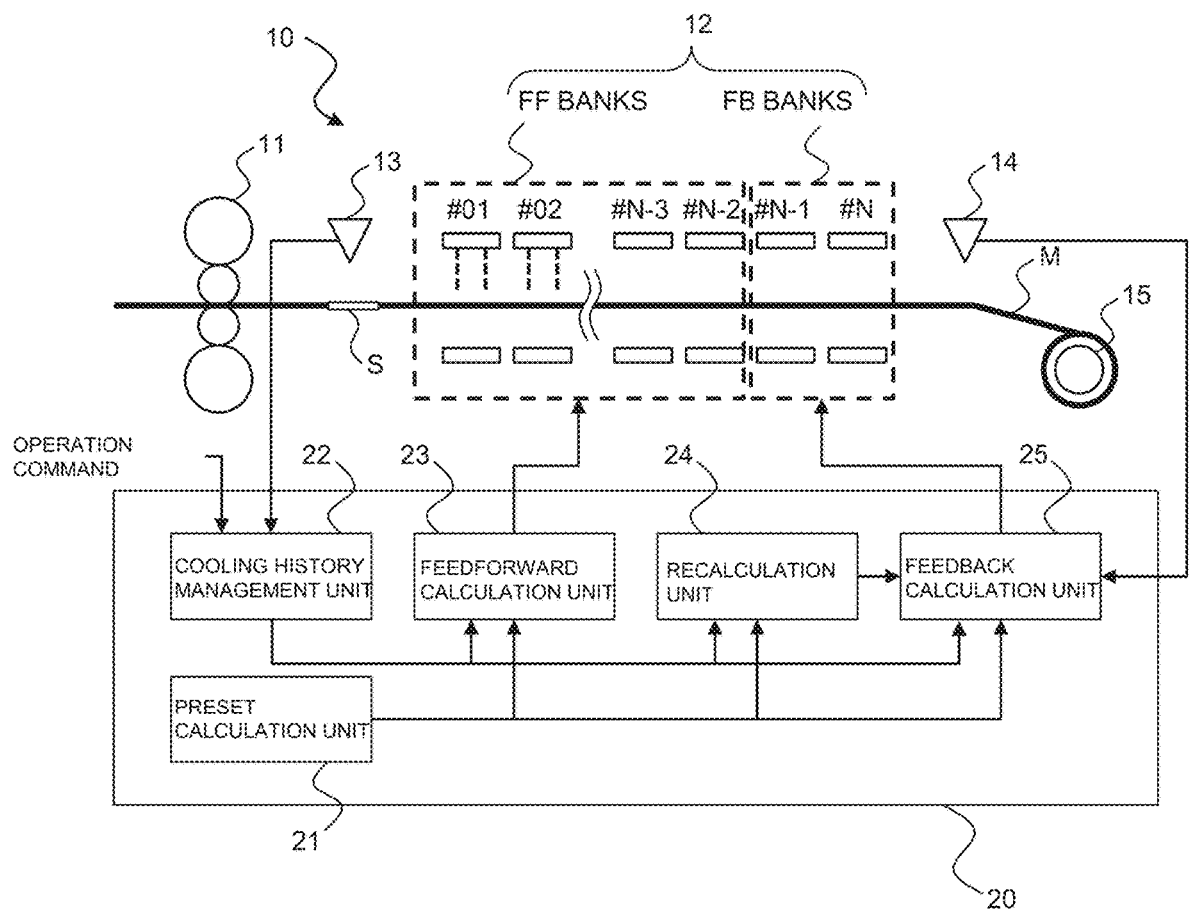
FIG. 2 is a diagram showing a functional configuration example of the control device according to the first embodiment.

FIG. 2 is a diagram showing a functional configuration example of the control device according to the first embodiment. As shown in FIG. 2, a control device 20 includes a preset calculation unit 21, a cooing history management unit 22, a feedforward calculation unit (FF calculation unit) 23, a recalculation unit 24, and a feedback calculation unit (FB calculation unit) 25. Note that these functions are realized by a processor of the control device 20 executing a predetermined program stored in a memory.

The preset calculation unit 21 determines initial water injection amounts of the cooling banks respectively, based on an operation command received from the host computer before starting to cool the strip M. The operation command includes a delivery side temperature target value $T_{CT}^{AIM}$ of the strip M, a cooling pattern and the like. The delivery side temperature target value TT is a target temperature of the strip M at the CT position. Examples of the cooling pattern include front-stage cooling and rear-stage cooling. Examples of them are as previously described.

In order to start cooling from a tip end portion of the strip M, the preset calculation unit 21 determines initial setting of the cooling banks and determines respective initial water injection amounts in the cooling banks, before the strip M reaches the entry side pyrometer 13. Timing for performing determination of the initial water injection amounts is determined by sufficiently considering a "valve response delay" that is a time period until the cooling water reaches the strip after the valve is opened. The "valve response delay" is synonymous with a "cooling bank response delay" in the present specification.

In the initial setting of the cooling banks, the cooling banks are set to an FF bank or an FB bank. In the first embodiment, the FF banks are set in order from an upstream side (upstream side in the rolling line) in the ROT 10, and the FB banks are set in order from a downstream side (downstream side in the rolling line) in the ROT 10. The cooling pattern is applied to the FF banks. In order not to break the cooling pattern, the total number of FB banks is about one to two according to specifications of a product. In the example shown in FIG. 2, cooling banks of #N−1 and #N correspond to the FB banks, and remaining cooling banks (that is, cooling banks of #01 to #N−2) correspond to the FF banks.

In determination of the initial water injection amount, a temperature drop prediction value dT of the strip M at a time of the strip M being conveyed from the FDT position to the CT position is calculated first. In calculation of the temperature drop prediction value dT, an entry side temperature prediction value $T_{FDT}^{CAL}$ indicating a predicted temperature of the strip M at the FDT position is used. Further, based on a result of the calculation, the delivery side temperature prediction value $T_{CT}^{CAL}$ indicating a predicted temperature of the strip M at the CT position is calculated. Subsequently, an initial water injection amount is determined such that the delivery side temperature prediction value $T_{CT}^{CAL}$ corresponds to the delivery side temperature target value $T_{CT}^{AIM}$. At a time of determination of the initial water injection amount, a value that anticipates future changes (increase and decrease) of the water injection amounts in the cooling banks is used.

Calculation of the delivery side temperature prediction value $T_{CT}^{CAL}$ is performed by using Expressions (1) and (2), for example.

$$T_{CT}^{CAL} = T_{FDT}^{PRE} - \int_{t(FDT)}^{t(CT)} dT(t) \quad (1)$$

$$dT(t) = \frac{1}{\gamma(T(t)) \cdot \rho \cdot h} q(v^{pre}(t), T(t), \delta^{pre}(t), \cdots) \cdot dt \quad (2)$$

Variables in Expressions (1) and (2) are as follows.
t(FDT): time [s] to pass the FDT position
t(CT): time [s] to pass the CT position
h: plate thickness [m] of the strip M
$\gamma(T(t))$: specific heat [J/(kg·degC)] at the temperature T
T(t): temperature [degC] of the strip M at the time t
$\rho$: density [kg/m³]
$q(v^{pre}(t), T(t), \delta^{pre}(t), \ldots)$: heat flux [W/m²]
$V^{pre}(t)$: predicted speed [m/s] of the strip M
$\delta^{pre}(t)$: determined type of cooling (water cooling by water injection or air cooling) [-]

Note that the predicted speed of the strip M is calculated based on a speed actual value of the strip M at an upstream side from the cooling facility 12, an operation situation of the hot rolling line and the like, and is repeatedly corrected as necessary.

The cooling history management unit 22 manages a position and a cooling history of the strip M based on a segment S. The segment S indicates one section when the strip M is divided into a virtual length in the conveyance direction. Management (grasp) of the positions of respective segments S passing through the cooling facility 12 is performed based on a speed of the strip M on the delivery side of the rolling mill (for example, the finishing mill 11). The speed may be calculated by using a roll rotation speed of the rolling mill, or may be directly measured. The cooling history of each of the segments S passing through the cooling facility 12 includes an actual speed of the segment S at each of positions of the cooling banks, and a history of each of the water injection amounts in the cooling banks.

The cooling history management unit 22 determines a recalculation position of feedback calculation (FB calculation) for each of the segments S. The recalculation position is a position at which recalculation of each of the water injection amounts in the FB banks is performed (namely, a position of re-execution of FB calculation). Re-execution of FF calculation is described later. Here, the recalculation position is described first.

Figure 3:
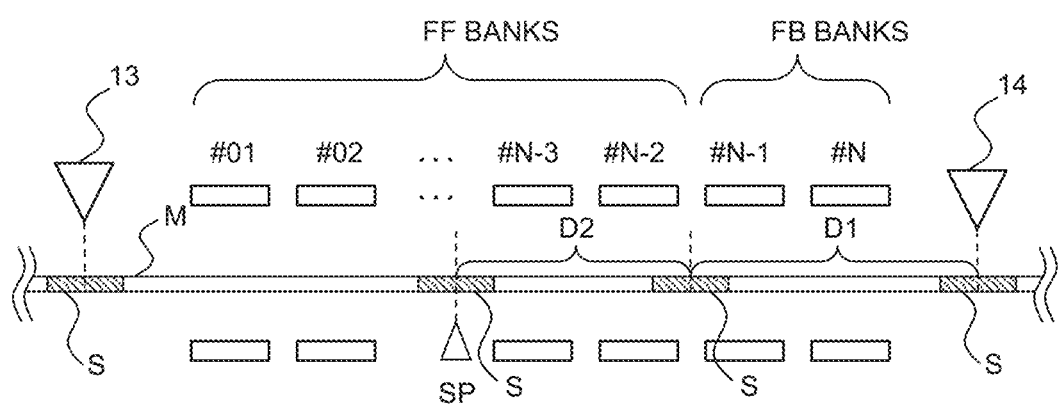
FIG. 3 is a diagram explaining a recalculation position.

FIG. 3 is diagram explaining the recalculation position. FIG. 3 shows a recalculation position SP for the cooling bank of #N−1. The recalculation position SP is located at the upstream side (upstream side in the rolling line) in the ROT 10 by a distance D2 corresponding to a dead time, from a position of the cooling bank of #N−1. The dead time corresponds to a valve response delay of the cooling bank of #N−1. Note that FIG. 3 shows a distance D1 adjacently to the distance D2. The distance D1 is a distance from the position of the cooling bank of #N−1 to the CT position.

When an $i^{th}$ (i is a natural number) segment Si passes through the FDT position, the FF calculation unit 23 calculates a delivery side temperature prediction value $T_{CT}^{CAL}(i)$ indicating a predicted temperature at the CT position, of the segment Si. Calculation of the delivery side temperature prediction value $T_{CT}^{CAL}(i)$ is performed by using Expressions (3) and (4), for example.

$$T_{CT}^{CAL}(i) = T_{FDT}^{ACT}(i) - \int_{t(FDT)(i)}^{t(CT)(i)} dT(t)(i) \quad (3)$$

$$dT(t)(i) = \frac{1}{\gamma(T(t)(i)) \cdot \rho \cdot h} q(v^{pre}(t)(i), T(t)(i), \delta^{pre}(t)(i), \cdots) \cdot dt \quad (4)$$

Variables shown in Expressions (3) and (4) are as follows.
$T_{FDT}^{ACT}(i)$: actual temperature [degC] of the segment Si at the FDT position
t(FDT)(i): time [s] at which the segment Si passes through the FDT position
t(CT): time [s] at which the segment Si passes through the CT position
T(t)(i): temperature [degC] of the segment Si at the time t The other variables are basically the same as the variables in Expressions (1) and (2).

The FF calculation unit 23 also changes each of the water injection amounts in the FF banks such that a difference between the delivery side temperature prediction value $T_{CT}^{CAL}(i)$ and the delivery side temperature target value $T_{CT}^{AIM}(i)$ becomes small. At a time of change, each of the water injection amounts is determined within a range of the cooling pattern to maintain the cooling pattern. After each of the water injection amounts is determined, FF control is performed. In FF control, a valve response delay is considered. Specifically, before the segment Si reaches a cooling bank the water injection amount of which is changed, an opening and closing operation of valves of the cooling bank is started in order to be in time for cooling based on a changed water injection amount.

The recalculation unit 24 recalculates the delivery side temperature prediction value $T_{CT}^{CAL}(i)$ at the CT position, of the segment Si, based on a temperature drop actual value $dT^{actcal}$ from the FDT position to the recalculation position SP and the temperature drop prediction value dT from the recalculation position SP to the CT position, when the segment Si reaches the recalculation position SP. The temperature drop actual value $dT^{actcal}$ is calculated based on a cooling history. The temperature drop prediction value dT is calculated based on the predicted speed of the strip M and each of the water injection amounts in the FB banks. Recalculation of the delivery side temperature prediction value $T_{CT}^{CAL}(i)$ is performed by using Expressions (5) to (7), for example.

$$T_{CT}^{CAL}(i) = T_{FDT}^{ACT}(i) - \int_{t(FDT)(i)}^{t(SP)(i)} dT^{actcal}(t)(i) - \int_{t(SP)(i)}^{t(CT)(i)} dT(t)(i) \quad (5)$$

$$dT^{actcal}(t)(i) = \frac{1}{\gamma(T(t)(i)) \cdot \rho \cdot h} q(v^{act}(t)(i), T(t)(i), \delta^{act}(t)(i), \cdots) \cdot dt \quad (6)$$

$$dT(t)(i) = \frac{1}{\gamma(T(t)(i)) \cdot \rho \cdot h} q(v^{act}(t)(i), T(t)(i), \delta^{act}(t)(i), \cdots) \cdot dt \quad (7)$$

Variables shown in Expressions (5) to (7) are as follows.
t(SP): time [s] at which the segment Si passes through the recalculation position SP
$v^{act}(t)$: actual speed [m/s] of the segment Si
$\delta^{act}(t)$: type of cooling obtained as an actual record of the segment Si (water cooling by water injection or air cooling) [-]

The other variables are basically the same as the variables in Expressions (1) to (4).

The FB calculation unit 25 performs FB calculation. In the FB calculation, a difference between the delivery side temperature actual value $T_{CT}^{ACT}$ indicating an actual temperature of the segment Si at the CT position and the delivery side temperature target value $T_{CT}^{AIM}$ is calculated. In the FB calculation, a temperature change of the segment Si due to a delay by a conveyance time period from each of positions of the FB banks to the CT position and a response delay of the FB banks is further compensated by using the Smith method. The FB calculation is described with reference to FIG. 4.

Figure 4:
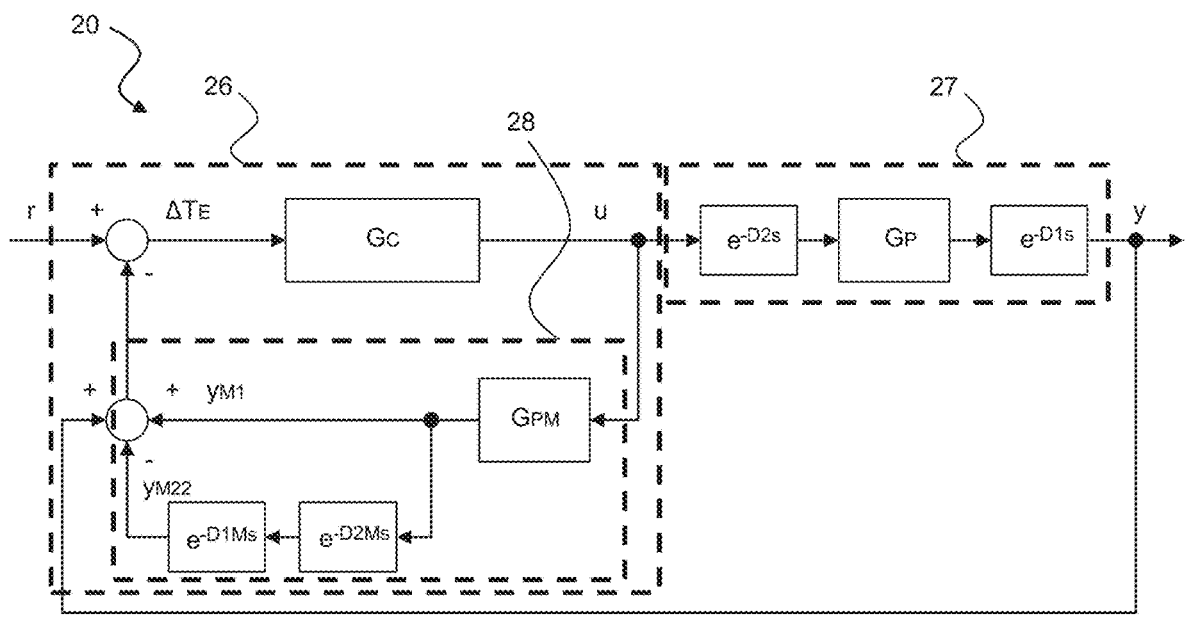
FIG. 4 is a control block diagram relating to FB control performed by the control device.

FIG. 4 is a control block diagram relating to the FB control performed by the control device 20. In FIG. 4, a feedback controller 26 and a control target 27 are drawn. The feedback controller 26 includes a PID controller $G_C$ and a Smith compensator 28.

The control target 27 is configured by a target plant $G_P$, a conveyance delay $e^{-D_1 s}$, and a valve response delay $e^{-D_2 s}$ ("s" is a Laplace operator). The conveyance delay $e^{-D_1 s}$ indicates a delay by a time period in which the segment Si is conveyed by the distance D1 from each of positions of the FB banks to the CT position. The valve response delay $e^{-D_2 s}$ indicates that a response of the FB banks delays by a dead time.

The Smith compensator 28 is configured by a target plant model $G_{PM}$, a conveyance delay model $e^{-D_1 Ms}$, and a valve response delay model $e^{-D_2 Ms}$. The conveyance delay model $e^{-D_1 MS}$ is a model for calculating a temperature correction value of the segment Si due to a delay by the conveyance time period from each of the positions of the FB banks to the CT position. The valve response delay model $e^{-D_2 MS}$ is a model for calculating a temperature correction value of the segment Si due to the response delay of the FB banks.

A temperature difference $\Delta T_E$ shown in Expression (8) is inputted to the PID controller 26a.

$$\Delta T_E = r - (y + y_{M1} - y_{M22}) \quad (8)$$

Figure 5:
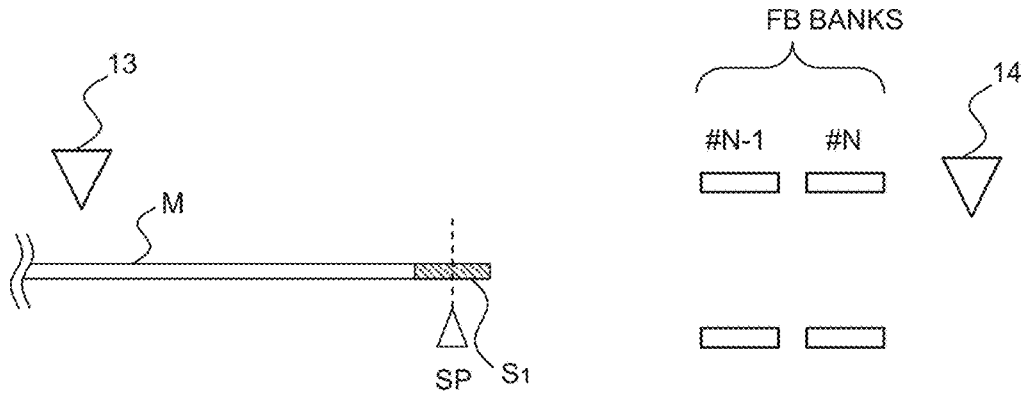
FIG. 5 is a diagram showing one example of control timing of temperature control performed by the control device.
Figure 5:
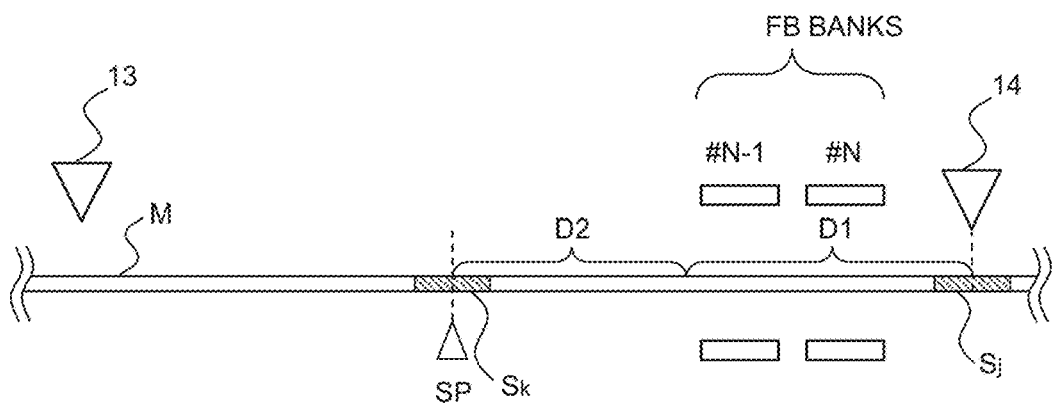
Figure 5:
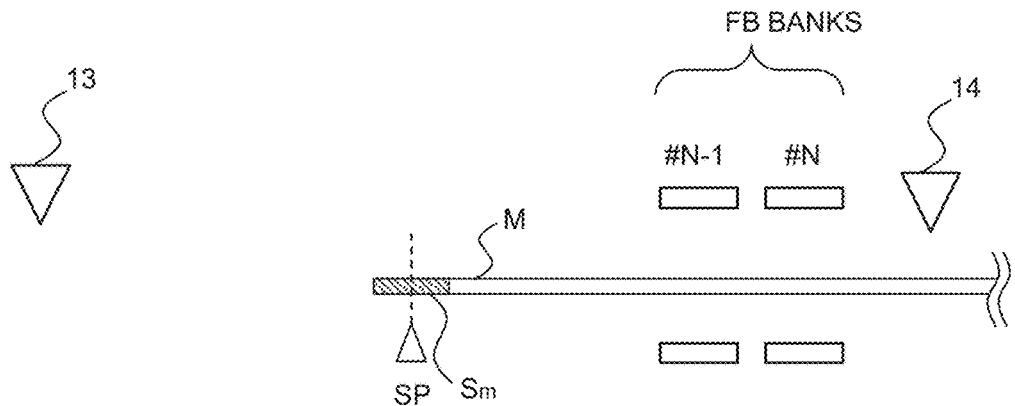
Figure 6:
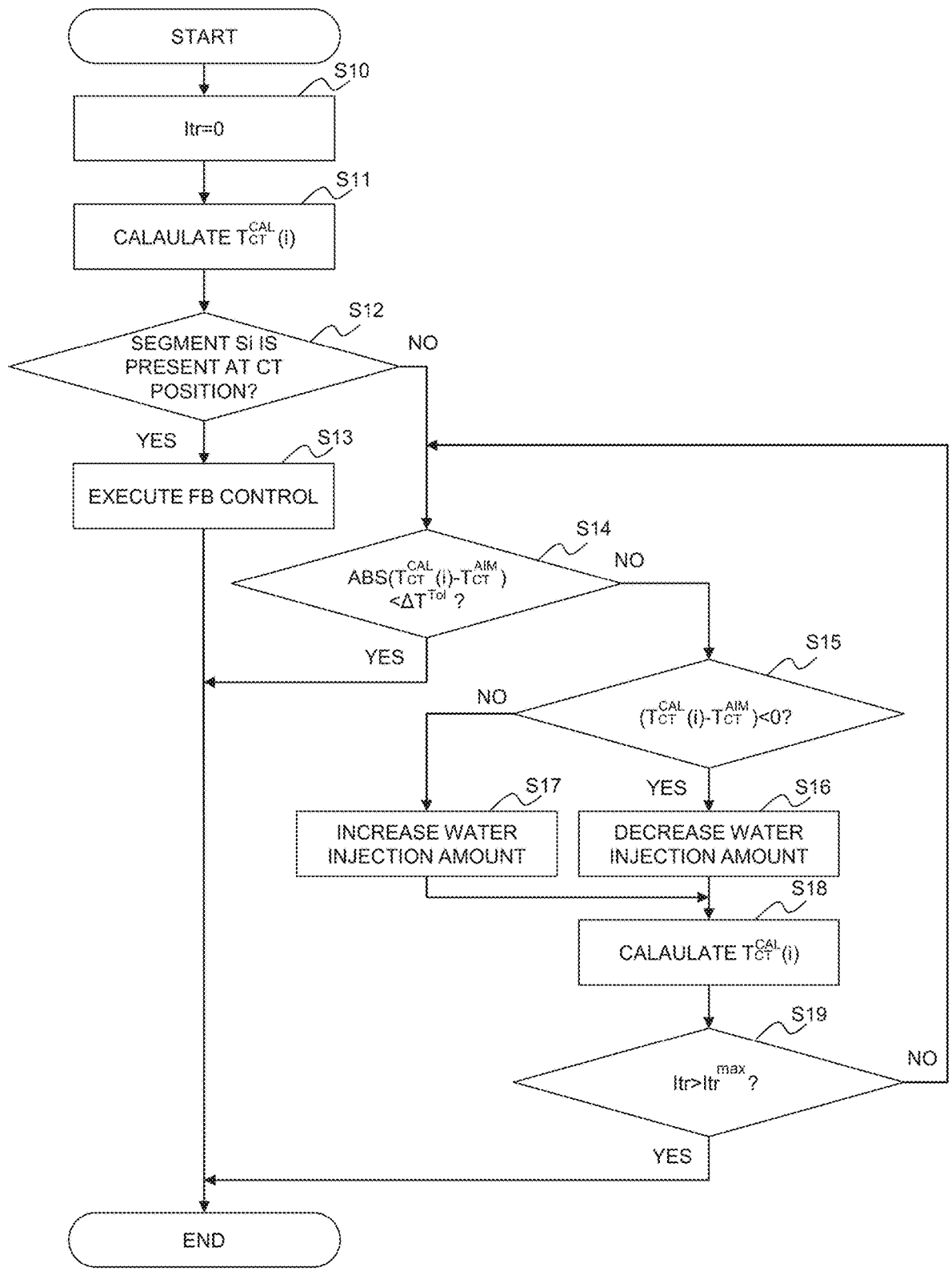
FIG. 6 is a flowchart showing a processing example of temperature control that is performed by the control device.

Variables shown in Expression (8) are as follows.
r: predicted temperature at the CT position, of the strip M obtained in preset calculation
y: actual temperature at the CT position, of the strip M
$y_{M1}$: predicted temperature at the CT position of the segment Si calculated when the segment Si reaches the recalculation position SP
$y_{M22}$: $y_{M1}$ that is calculated when the segment Si reaches the recalculation position SP, and $y_{M1}$ recorded in a memory after the calculation and is read from the memory when the segment Si reaches the CT position 1-3. Flow of Temperature Control by Control Device A flow of control until end from a start of cooling of the strip M by the cooling facility 12 is described with reference to FIGS. 5 and 6. FIG. 5 is a diagram showing one example of control timing of temperature control that is performed by the control device 20. FIG. 6 is a flowchart showing a processing example of the temperature control performed by the control device 20.

The strip M is continuously rolled in a rolling mill that is located upstream of the ROT 10. Therefore, it takes several minutes until a segment Sm (m is a natural number) at a rearmost end of the strip M passes through the delivery side pyrometer 14 after a segment 51 at a frontmost end of the strip M passes through the entry side pyrometer 13, for example. In FIG. 5(i), a situation of the ROT 10 before start of the FB control is drawn. As shown in FIG. 5(i), the segment 51 passing through the FDT position advances on the ROT 10 to reach the recalculation position SP. Note that the recalculation position SP shown in FIG. 5(i) is based on the position of the cooling bank of #N-1.

Each time the segment Si (1≤i≤m) reaches the recalculation position SP, a routine shown in FIG. 6 is executed. In the routine shown in FIG. 6, a counter ltr is set to zero first (step S10). The counter ltr is used in convergence calculation that is performed in processes in and after step S14.

Subsequently to a process in step S10, the delivery side temperature prediction value $T_{CT}^{CAL}(i)$ is calculated (recalculated) (step S11). Calculation (recalculation) of the delivery side temperature prediction value $T_{CT}^{CAL}(i)$ is performed by using Expressions (5) to (7), for example. The delivery side temperature prediction value $T_{CT}^{CAL}(i)$ calculated in a process in step S11 is stored in the memory as a predicted temperature yM1(i).

Subsequently to the process in step S11, it is determined whether or not the segment Si is present at the CT position (step S12). A process in step S12 is performed to determine whether or not to start FB control. Whether or not the segment Si is present at the CT position is determined based on the actual temperature of the strip M measured in the delivery side pyrometer 14, for example.

When it is determined that the segment Si is present at the CT position in the process in step S12, FB control is executed (step S13). In FIG. 5 (ii), a situation of the ROT 10 during execution of the FB control is drawn. In FIG. 5 (ii), a segment Sj (1≤j≤m) that is present at the CT position, and a segment Sk (1≤k≤m) that is present at the recalculation position SP are drawn.

However, measurement of an actual temperature of a frontmost end portion of the segment Sk may not be stable. Therefore, execution of the FB control to the segment Sk when the frontmost end portion arrives at the CT position is started by being delayed by a predetermined time (for example, several seconds) from the arrival. In the FB control, a temperature difference $\Delta T_E$ is calculated by using Expression (8) described above, and the water injection amount in the FB bank of #N-1 is changed based on the temperature difference $\Delta T_E$.

For example, the temperature difference $\Delta T_E$ at the time of the segment Sk arriving at the recalculation position SP is calculated by substituting the predicted temperatures $y_{M1}$ and $y_{M22}$ that are calculated by using Expressions (9) and (10) into Expression (8) described above.

$$y_{M22} = y_{M1}[j] \quad (9)$$

$$y_{M1} = y_{M1}[k] \quad (10)$$

Here, the reason why $y_{M1}[j]$ is used for the predicted temperature $y_{M22}$ in Expression (9) is as follows. That is to say, as described in explanation of Expression (8), the predicted temperature $y_{M22}$ shown in Expression (8) is a predicted temperature at the CT position, of the segment Si with the conveyance delay and the valve response delay taken into consideration, which is calculated when the segment Si reaches the recalculation position SP. Note that the predicted temperature is equal to the predicted temperature at the CT position, of the segment Sj, which is calculated when the segment Sj reaches the recalculation position SP. Therefore, in Expression (9), $y_{M1}[j]$ is used for the predicted temperature $y_{M22}$.

Calculation of the predicted temperature $y_{M1}[k]$ shown in Expression (10) is performed based on Expression (5) described above (however, "i" in Expression (5) is read as "k").

A process in step S13 is repeatedly executed while it is determined that the segment Si is present at the recalculation position SP. In FIG. 5 (iii), a situation at a time when the segment Sm (segment Si at the rearmost end) reaches the recalculation position SP is drawn. After the segment Sm passes through the recalculation position SP, the processes of the routine shown in FIG. 6 are ended.

When it is determined that the segment Si is not present at the CT position in the process in step S12, the processes in and after step S14 are executed. The processes in and after step S14 are temperature control before start of the FB control. In step S14, it is determined whether or not an absolute value of a difference between the delivery side temperature prediction value $T_{CT}^{CAL}(i)$ calculated in the process in step S11 and the delivery side temperature target value $T_{CT}^{AIM}$ is smaller than a threshold $\Delta T^{tol}$. The threshold $\Delta T^{tol}$ is a temperature difference requiring a change in the water injection amounts in the FB banks, and is set in advance.

When it is determined that the absolute value is the threshold $\Delta T^{tol}$ or more in a process in step S14, it is determined whether or not a sign of the difference between the delivery side temperature prediction value $T_{CT}^{CAL}(i)$ and the delivery side temperature target value $T_{CT}^{AIM}$ is negative (step S15). The negative sign of the difference means that the delivery side temperature prediction value $T_{CT}^{CAL}(i)$ is lower than the delivery side temperature target value $T_{CT}^{AIM}$. On the contrary, the positive sign of the difference means that the delivery side temperature prediction value $T_{CT}^{CAL}(i)$ is higher than the delivery side temperature target value $T_{CT}^{AIM}$.

Accordingly, when the sign is determined as negative, the water injection amounts in the FB banks are decreased (step S16). Decrease of the water injection amount is specifically performed by closing one of the valves of the FB bank. When the sign is determined as positive, the water injection amounts in the FB banks are increased (step S17). Increase of the water injection amount is specifically performed by opening one of the valves of the FB bank.

Subsequently to the processes in step S16 or S17, the delivery side temperature prediction value $T_{CT}^{CAL}(i)$ is calculated (recalculated again) (step S18). A content of a process in step S18 is basically the same as that of the process in step S12. The delivery side temperature prediction value $T_{CT}^{CAL}(i)$ calculated in the process in step S18 is stored in the memory as the predicted temperature yM1(i).

Subsequently to the process in step S18, it is determined whether or not the counter ltr is below a threshold $ltr^{max}$ (step S19). The threshold $ltr^{max}$ is an upper limit of a number of repetitions of the processes in steps S14 to S18 and is set in advance. The threshold $ltr^{max}$ is set by considering a length of the segment S(i), an actual speed record of the segment s(i), a calculation processing speed of the processor and the like so as not to hinder execution of the temperature control of a segment S(i+1) that reaches the recalculation position SP next to the segment S(i).

When it is determined that the counter ltr is more than the threshold value $ltr^{max}$ in a process in step S19, the processes of the routine shown in FIG. 6 are ended. When it is determined otherwise, the flow returns to the process in step S14.

1-4. Effect

Figure 7:
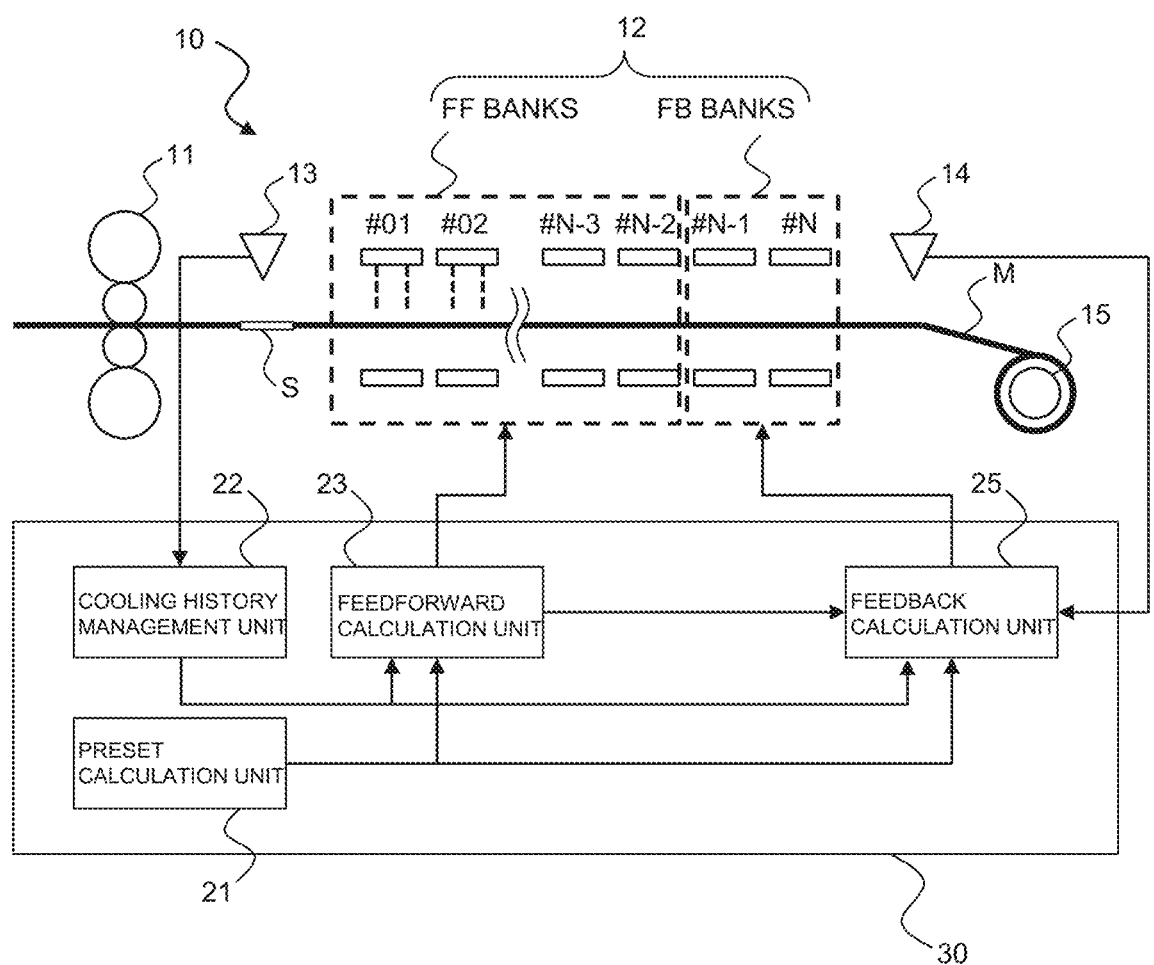
FIG. 7 is a diagram showing a functional configuration of a comparative example of the control device according to the first embodiment.
Figure 8:
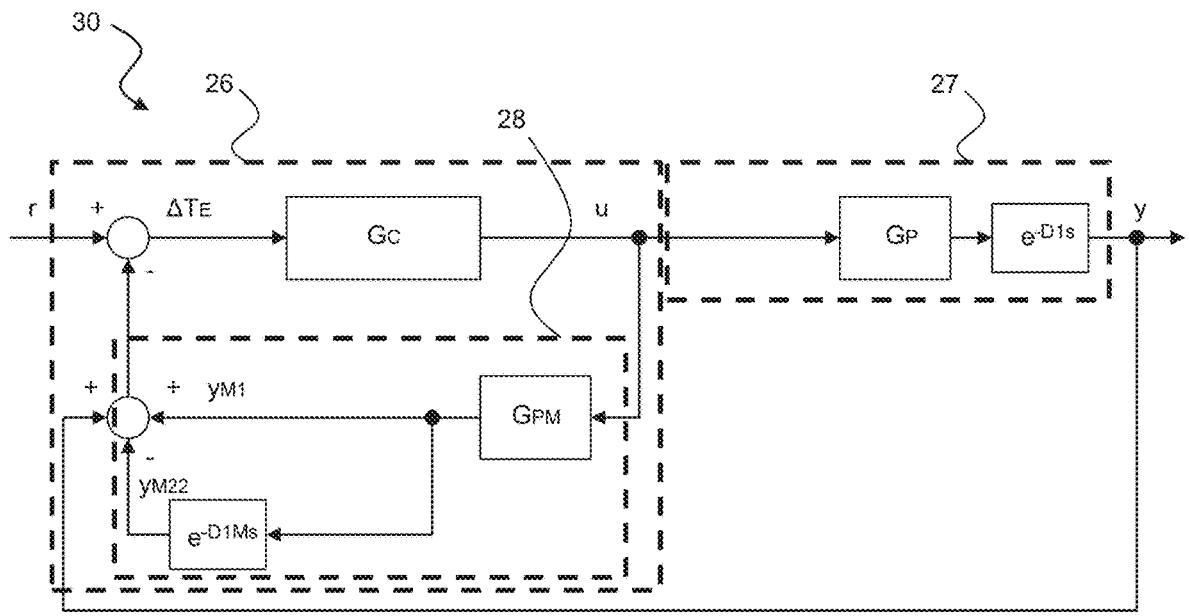
FIG. 8 is a control block diagram relating to FB control performed by a control device in the comparative example.

An effect according to the first embodiment is described with reference to FIGS. 7 and 8. FIG. 7 is a diagram showing a configuration of a comparative example of the control system according to the first embodiment. FIG. 8 is a control block diagram relating to FB control performed by the control device in this comparative example. FIG. 7 corresponds to FIG. 2, and FIG. 8 corresponds to FIG. 4.

As is understood when FIG. 2 and FIG. 7 are compared, in the comparative example shown in FIG. 7, a functional configuration of a control device 30 differs from that of the control device 20 shown in FIG. 2. Specifically, the control device 30 differs from the control device 20 in that the control device 30 does not include the recalculation unit 24.

As already described, the recalculation unit 24 recalculates the delivery side temperature prediction value $T_{CT}^{CAL}(i)$ based on the temperature drop actual value $dT^{actcal}$ from the FDT position to the recalculation position SP, and the temperature drop prediction value dT from the recalculation position SP to the CT position. In contrast to this, the control device 30 does not include the recalculation unit 24. Therefore, the control device 30 can perform only FB calculation based on a difference between a delivery side temperature actual value $T_{CT}^{ACT}$ indicating the actual temperature of the segment Si at the CT position, and the delivery side temperature target value $T_{CT}^{AIM}$, in FB control of each of the water injection amounts in the FB banks.

In this regard, according to the first embodiment, the delivery side temperature prediction value $T_{CT}^{CAL}(i)$ is recalculated in the recalculation position SP. Further, the recalculated delivery side temperature prediction value $T_{CT}^{CAL}(i)$ is considered in the temperature difference $\Delta T_E$ that is inputted to the PID controller 26a. Accordingly, it becomes possible to bring about stability of temperature control to various rolling speeds.

Here, as in the first embodiment of PTL 1, compensating a dead time due to conveyance of the strip in the FB control is considered. Thus, a configuration in which compensation of the dead time is performed in the control device 30 in FIG. 7 is considered. A control block diagram relating to the FB control of each of the water injection amounts in the FB banks performed by the control device 30 in this case corresponds to FIG. 8. As is understood when FIG. 4 and FIG. 8 are compared, in the comparative example shown in FIG. 8, a valve response delay $e^{-D2S}$ is not included in the control target 27. Further, a Smith compensator 28 does not have a valve response delay model $e^{-D2MS}$. Therefore, in the comparative example shown in FIG. 8, the valve response delay is not considered in a temperature difference $\Delta T_E$ to be inputted to the PID controller 26a.

In this regard, according to the first embodiment, both the conveyance delay and the valve response delay are considered in the temperature difference $\Delta T_E$, such that it is possible to enhance stability of temperature control to various rolling speeds. Specifically, a case in which the distance from the recalculation position SP to the CT position shown in FIG. 2 is 20 m, and the conveyance speed of the strip M is 10 or 20 m/s is considered. In this case, the conveyance time period is 2.0 s or 1.0 s. Since a valve response delay is generally about 2 to 2.5 s, the valve response delay cannot be ignored. Further, the conveyance speed of the strip M tends to increase as the plate thickness becomes smaller, and the conveyance speed, which is 2.0 m/s for a plate thickness of 20 mm, increases to 20 m/s for a plate thickness of 1.2 mm. Accordingly, at a time of rolling a thin product in particular, an influence of the valve response delay increases.

As above, according to the first embodiment, FB control in which the recalculated delivery side temperature prediction value $T_{CT}^{CAL}(i)$, the conveyance delay, and the valve response delay are considered is performed. Accordingly, it becomes possible to control the actual temperature of the segment Si to a target temperature. Further, according to the first embodiment, about one to two FB banks are set at the downstream side in the ROT 10 (downstream side in the rolling line). Accordingly, it becomes possible to control the actual temperature of the segment Si to the target temperature while observing the cooling pattern in the FF banks that are set at the upstream side in the ROT 10 (upstream side in the rolling line).

2. Second Embodiment

Next, a temperature control system according to a second embodiment of the present invention is described with reference to FIGS. 9 to 13. Note that explanation that overlaps with the explanation of the first embodiment is omitted as appropriate.

2-1. Outline of Second Embodiment

According to the FB control of the first embodiment, it becomes possible to control the actual temperature of the segment Si to the target temperature even if there is a change in speed of the material to be rolled. However, since the number of valves of the FB bank is limited, there is a limit to a margin for increase or a margin for decrease of the water injection amount. Therefore, in the second embodiment, water injection in an FB bank is transferred to water injection in an FF bank before the water injection amount in the FB bank reaches a maximum water injection amount or a minimum water injection amount.

Figure 9:
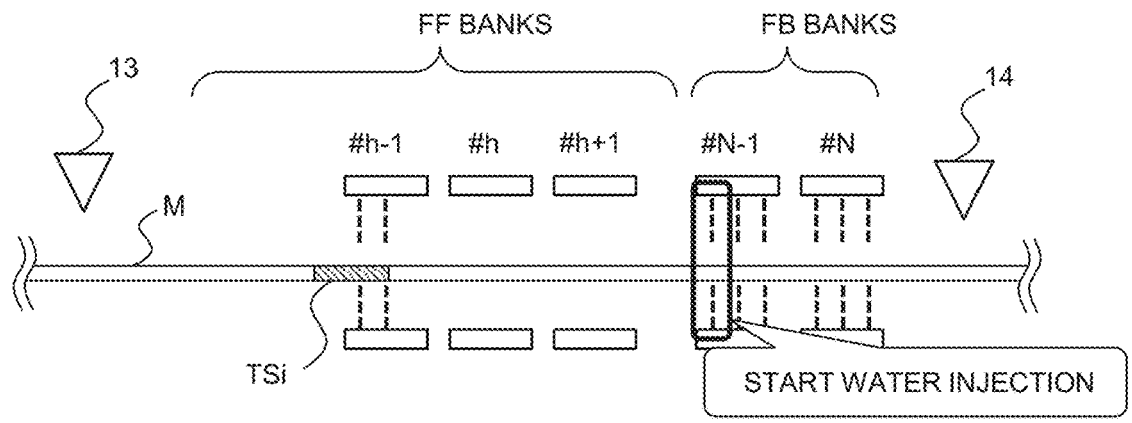
FIG. 9 is a diagram explaining an outline of control when a water injection amount in an FB bank approaches a maximum water injection amount.
Figure 9:
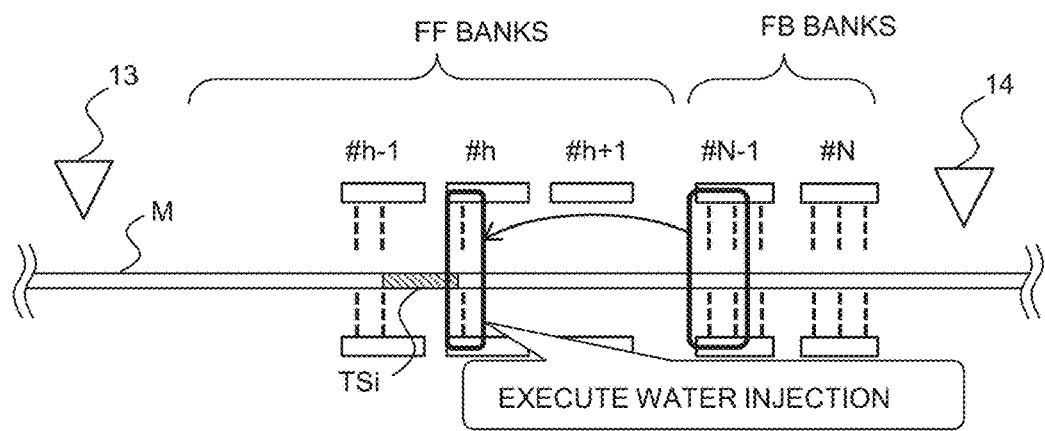
Figure 9:
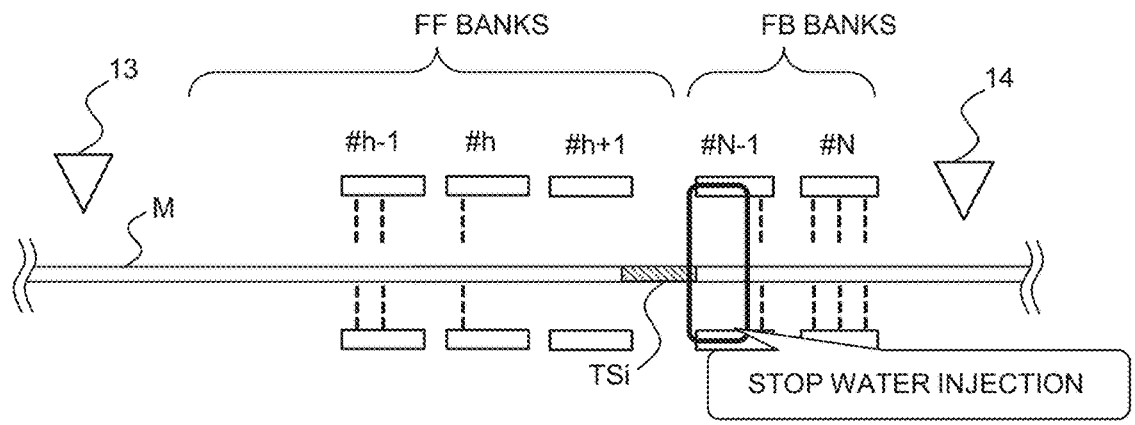

FIG. 9 is a diagram explaining an outline of control when the water injection amount in the FB bank approaches a maximum water injection amount (MAX). In FIG. 9, attention is paid to a cooling bank of #N−1 as the FB bank. As shown in FIG. 9(i), cooling water is supplied from six valves in total in the cooling bank of #N−1. FIG. 9(i) shows a situation directly after two upper and lower valves that are located at an upstream side in a rolling line are further opened in a situation in which four valves in total of the cooling bank of #N−1 are already opened. Here, when a total number of valves of the cooling bank of #N−1 is, for example, eight, it can be said that in the situation shown in FIG. 9(i), the water injection amount in the FB bank approaches the maximum water injection amount. On the other hand, in a cooling bank of #h (1≤h≤N−2) as the FF bank, supply of the cooling water is not performed (that is, air cooling).

Thus, in the second embodiment, as shown in FIG. 9(ii), water injection from the four valves in total of the cooling bank of #N−1 is transferred to water injection from two valves in total of the cooling bank of #h. When the transfer cannot be covered by the water injection from the cooling bank of #h alone, the water injection in the cooling bank of #N−1 may be shared between the cooling bank of #h and the other cooling banks while observing a cooling pattern. For example, when the cooling pattern is front-stage cooling, in order to observe the pattern of the cooling, the water injection in the cooling bank of #N−1 may be shared between cooling banks of #h and #h+1. Water injection in the cooling bank of #h following the transfer is started before a segment Si (Hereinafter, also referred to as a "target segment TSi".) for which the transferred water injection is performed reaches a position of the cooling bank of #h. The water injection in the cooling bank #h is started with a valve response delay taken into consideration.

As shown in FIG. 9 (iii), stop of water injection from the four valves of the cooling bank of #N−1 following the transfer is performed before the target segment TSi reaches the position of the cooling bank of #N−1. Stop of water injection is performed earlier correspondingly to the valve response delay such that the target segment TSi is not exposed to the cooling water.

Figure 10:
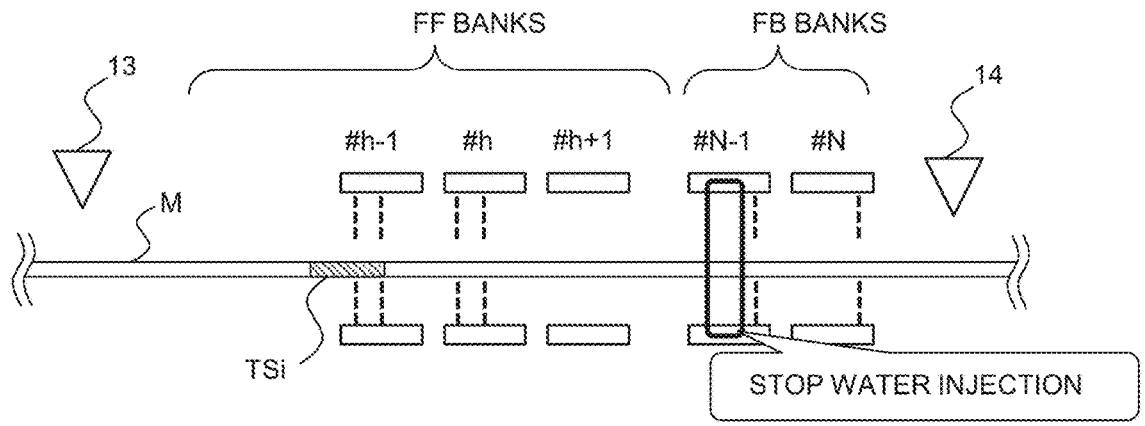
FIG. 10 is a diagram explaining an outline of control when the water injection amount in the FB bank approaches a minimum water injection amount.
Figure 10:
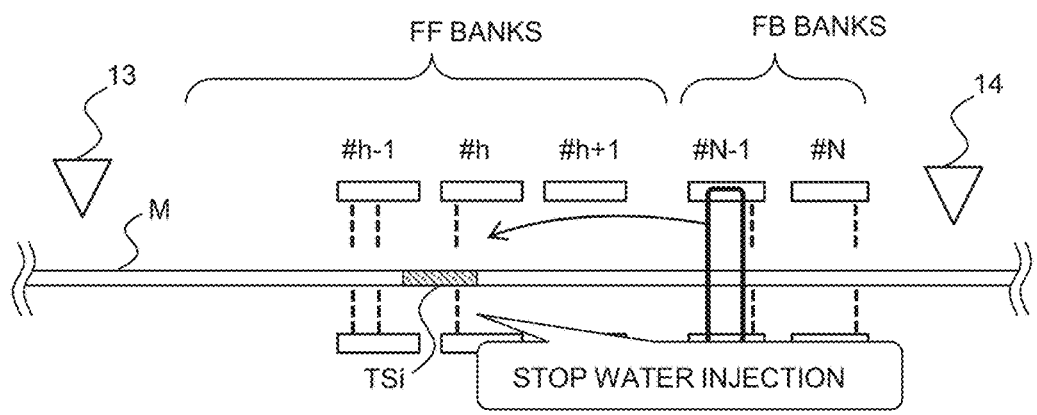
Figure 10:
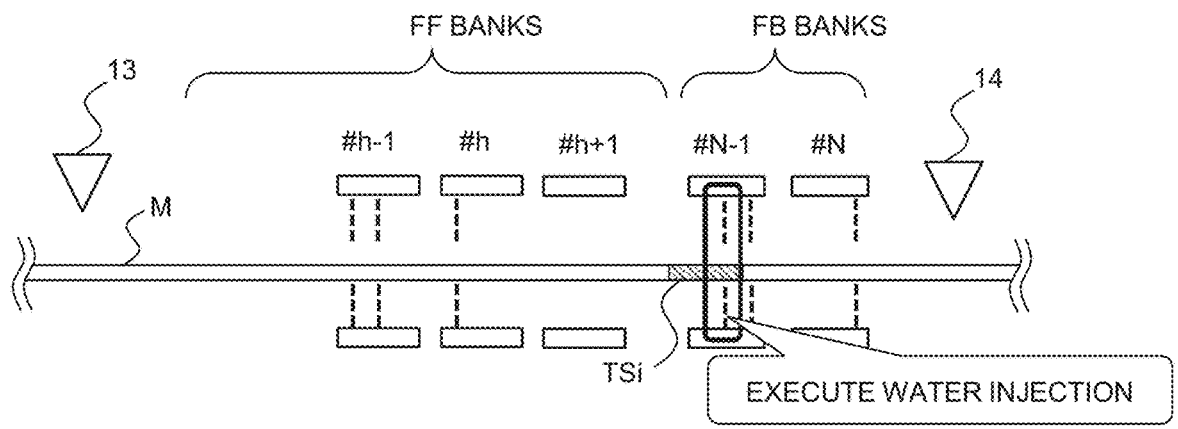

FIG. 10 is a diagram explaining an outline of control when the water injection amount in the FB bank approaches a minimum water injection amount (MIN). As in FIG. 9, in FIG. 10, attention is also paid to the cooling bank of #N−1 as the FB bank. As shown in FIG. 10 (i), in the cooling bank of #N−1, cooling water is supplied from two valves in total. FIG. 10 (i) shows a situation directly after two upper and lower valves located at the upstream side in the rolling line are closed in a situation in which four valves in total of the cooling bank of #N−1 are already opened. Therefore, it can be said that in the situation shown in FIG. 10 (i), the water injection amount in the FB bank approaches the minimum water injection amount. On the other hand, in the cooling bank of #h as the FF bank, supply of the cooling water is performed from four valves in total.

In the second embodiment, as shown in FIG. 10 (ii), stop of the water injection from the two valves in total of the cooling bank of #N−1 is transferred to stop of the water injection from the two valves in total of the cooling bank of #h. When the transfer cannot be covered by stop of the water injection of the cooling bank of #h alone, the water injection in the cooling bank of #N−1 may be shared between the cooling bank of #h and the other cooling banks while observing the cooling pattern. For example, when the cooling pattern is front-stage cooling, stop of the water injection in the cooling bank of #N−1 may be shared between the cooling banks of #h−1 and #h in order to observe the pattern of the cooling. Stop of the water injection in the cooling bank of #h following the transfer is performed before the target segment TSi reaches the position of the cooling bank of #h. Stop of the water injection in the cooling bank of #h is performed with the valve response delay taken into consideration.

As shown in FIG. 10 (iii), water injection from the two valves of the cooling bank of #N−1 following the transfer is performed before the target segment TSi reaches the position of the cooling bank of #N−1. The water injection is performed earlier correspondingly to the valve response delay such that the target segment TSi is exposed to the cooling water.

Whether or not to perform transfer of water injection is determined based on conditions (11) and (12) as follows concerning an upper limit side threshold corresponding to the maximum water injection amount, or a lower limit side threshold corresponding to the minimum water injection amount, for example. When condition (11) or (12) is satisfied, transfer of water injection is performed.

$$N_{FB}^{ON} \geq \alpha_{FB}^{UP} \cdot N_{FB}^{AVA} \tag{11}$$

$$N_{FB}^{ON} \leq \alpha_{FB}^{LW} \cdot N_{FB}^{AVA} \tag{12}$$

Meanings of values of both sides of conditions (11) and (12) are as follows.

Figure 11:
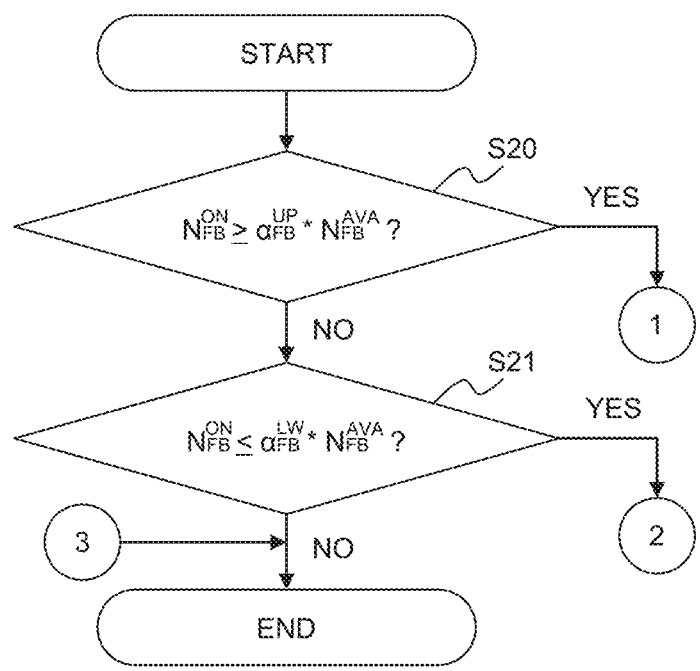
FIG. 11 is a flowchart showing a processing example of temperature control performed by a control device in a second embodiment.
Figure 12:
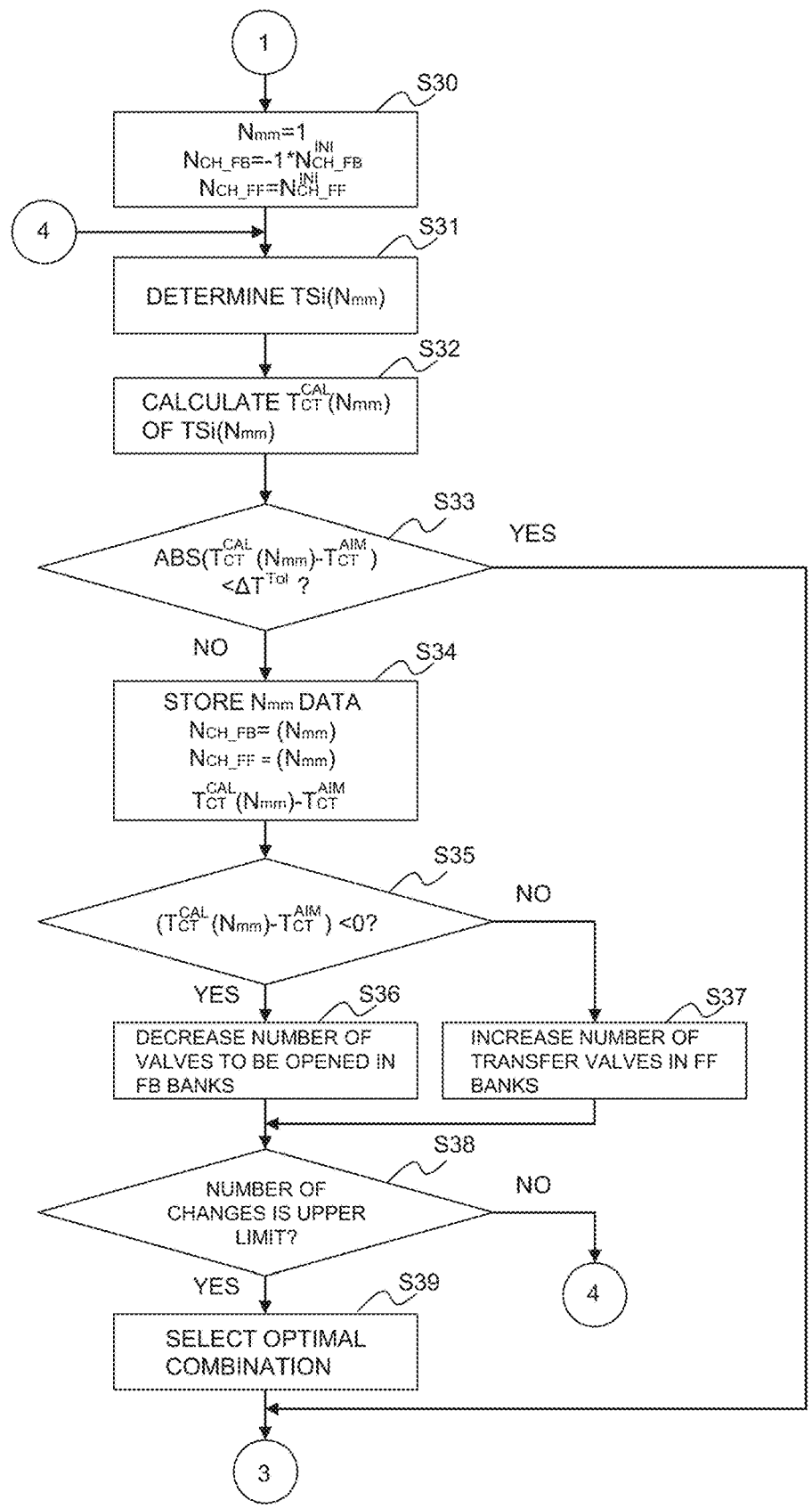
FIG. 12 is a flowchart showing a processing example of the temperature control performed by the control device in the second embodiment.
Figure 13:
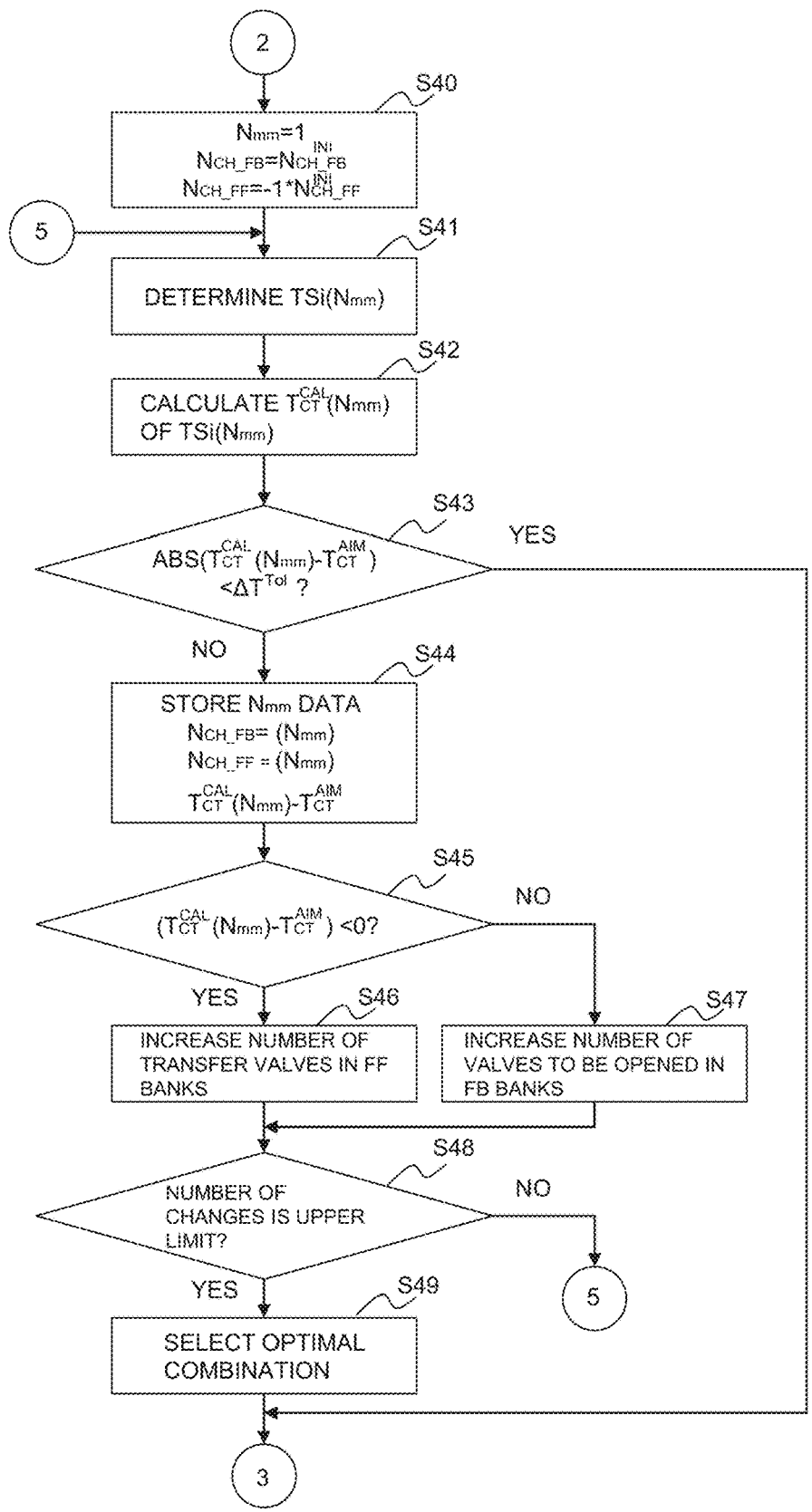
FIG. 13 is a flowchart showing a processing example of the temperature control performed by the control device in the second embodiment.

$\alpha_{FB}^{UP}$: adjustment factor of the upper limit side threshold
$\alpha_{FB}^{LW}$: adjustment factor of the lower limit side threshold
$N_{FB}^{AVA}$: total number of usable valves
$N_{FB}^{ON}$: total number of valves opened at present 2-2. Processing Example by Control Device FIGS. 11 to 13 are flowcharts showing a processing example of temperature control performed by a control device 20 in the second embodiment. The flowcharts shown in FIGS. 11 to 13 are executed as a part of the process in step S13 shown in FIG. 6, for example.

In a routine shown in FIG. 11, it is determined whether or not condition (11) is satisfied, first (step S20). Satisfaction of condition (11) means that a water injection amount in the FB bank approaches the maximum water injection amount. In this case, processes of a routine shown in FIG. 12 are executed. On the other hand, when it is determined that condition (11) is not satisfied, it is determined whether or not condition (12) is satisfied (step S21). Satisfaction of condition (12) means that the water injection amount in the FB bank approaches the minimum water injection amount. In this case, processes of a routine shown in FIG. 13 are executed.

2-2-1. When Water Injection Amount is Approaching Maximum Water Injection Amount In the routine shown in FIG. 12, a case number Nmm is set first (step S30). The case number Nmm is a consecutive number for storing a result of processes in steps S31 to S33 in a memory (initial value of Nmm is 1). In a process in step S30, an initial value $N_{CH\_FF}^{INI}$ of a number of valve changes $N_{CH\_FF}$ of the FF bank, and an initial value $N_{CH\_FB}^{INI}$ of a number of valve changes $N_{CH\_FB}$ of the FB bank are set.

The initial values $N_{CH\_FF}^{INI}$ and $N_{CH\_FB}^{INI}$ are expressed by Expressions (13) and (14).

$$N_{CH\_FB} = -1 \cdot N_{CH\_FB}^{INI} \qquad (13)$$

$$N_{CH\_FF} = N_{CH\_FF}^{INI} \qquad (14)$$

Note that the numbers of changes $N_{CH\_FB}$ and $N_{CH\_FF}$ can be appropriately changed as adjustment terms.

An upper limit $N_{CH\_FB}^{MAX\_Dec}$ of the number of changes $N_{CH\_FB}$ at a time of decreasing the number of valves of the FB bank is set in advance. For example, it is assumed that four valves can be closed at maximum by one change (that is, $N_{CH\_FB}^{MAX\_Dec}=4$). On the other hand, as an upper limit $N_{CH\_FF}^{MAX\_Inc}$ of the number of changes $N_{CH\_FF}$ when increasing the number of valves of the FF bank, a number of valves in a closed state and usable in a present condition (that is, valves changeable to an open state by transfer) is set according to a cooling pattern.

In the process in step S30, valves of the FF bank to be a transfer target (Hereinafter, also referred to as "transfer valves".) are further determined according to the cooling pattern. A case in which the cooling pattern is front-stage cooling is considered. In this case, the transfer valve is a valve located most upstream in a ROT 10 (that is, a valve of the FF bank closest to an entry side of a cooling facility 12) among valves in a closed state and usable in the present condition, of the FF bank. When the number of changes $N_{CH\_FB}$ is two or more, two or more valves of the FF bank to be a transfer target (hereinafter, also referred to as a "transfer bank") correspond to the transfer valves.

Subsequently to the process in step S30, the target segment TSi is determined (step S31). When a certain valve of the FF bank is opened, there is a valve response delay until a water injection amount of the valve actually changes. Therefore, in the process in step S31, in order to perform early transfer, a segment Si that first passes through a position of the transfer valve is predicted, when the water injection amount changes by opening the transfer valve. The segment Si is set to be the target segment TSi.

Note that in a calculator control system of recent years, a calculation time period and a transmission time period are about several msecs, such that a time period required for the prediction calculation of the target segment TSi has almost no effect on a temperature change of the target segment TSi. Further, in the prediction calculation, a time period required for conveyance of the target segment TSi is calculated by a predicted speed of the strip M. The predicted speed is calculated based on a speed actual value of the strip M, an operation situation of the hot rolling line and the like, and is repeatedly corrected as necessary.

Subsequently to the process in step S31, a delivery side temperature prediction value $T_{CT}^{CAL}$ (Nmm) indicating a predicted temperature at a CT position of the target segment TSi is calculated (step S32). Calculation of the delivery side temperature prediction value $T_{CT}^{CAL}$ (Nmm) is performed by using Expressions (5) to (7), for example, (however, "segment Si" in each of Expressions (5) to (7) is read as "target segment TSi").

Subsequently to a process in step S32, it is determined whether or not an absolute value of a difference between the delivery side temperature prediction value $T_{CT}^{CAL}$ (Nmm) calculated in the process in step S32 and a delivery side temperature target value $T_{CT}^{AIM}$ is smaller than a threshold $\Delta T^{tol}$ (step S33). A process in step S33 is basically the same as the process in step S14 shown in FIG. 6.

When it is determined that the absolute value is the threshold value $\Delta T^{tol}$ or more in the process in step S33, results of the processes in steps S31 to S33 are stored (step S34). Subsequently, it is determined whether or not a sign of the difference between the delivery side temperature prediction value $T_{CT}^{CAL}$ (Nmm) and the delivery side temperature target value $T_{CT}^{AIM}$ is negative (step S35). A process in step S35 is the same as the process in step S15 shown in FIG. 6.

A negative sign of the difference means that the delivery side temperature prediction value $T_{CT}^{CAL}$ (Nmm) is lower than the delivery side temperature target value $T_{CT}^{AIM}$. Therefore, when it is determined that the sign is negative, the number of valves in an open state, of the FB bank is reduced by one (the number of changes $N_{CH\_FB}$ the number of changes $N_{CH\_FB}-1$) (step S36). Thereby, the water injection amount in the FB bank decreases, and therefore, the delivery side temperature prediction value $T_{CT}^{CAL}$ (Nmm) rises.

A positive sign of the difference means that the delivery side temperature prediction value $T_{CT}^{CAL}$ (Nmm) is higher than the delivery side target value $T_{CT}^{AIM}$. Therefore, it is considered to increase the number of valves in an open state, of the FB bank, but the water injection amount in the FB bank approaches the maximum water injection amount. Therefore, when it is determined that the sign is positive, the number of transfer valves (valves that are switched to an open state from a closed state) in the transfer bank is increased by one (the number of changes $N_{CH\_FF}$ the number of changes $N_{CH\_FF}+1$) (step S37). Thereby, the water injection amount in the transfer bank increases, such that the delivery side temperature prediction value $T_{CT}^{CAL}$ (Nmm) decreases.

Subsequently to the process in step S36 or S37, it is determined whether or not the number of changes $N_{CH\_FB}$ or $N_{CH\_FF}$ reaches an upper limit (step S38). A process in step S38 is performed depending on whether or not condition (15) or (16) is satisfied.

$$\text{abs}(N_{CH\_FB}) > N_{CH\_FB}^{MAX\_Dec} \qquad (15)$$

$$\text{abs}(N_{CH\_FF}) > N_{CH\_FF}^{MAX\_Inc} \qquad (16)$$

In Expression (15), $\text{abs}(N_{CH\_FB})$ is an absolute value of the number of changes $N_{CH\_FB}$, and in Expression (16), $\text{abs}(N_{CH\_FF})$ is an absolute value of the number of changes $N_{CH\_FF}$.

When it is determined that the number of changes $N_{CH\_FB}$ or $N_{CH\_FF}$ does not reach the upper limit in a process in step S38, the case number Nmm is increased by one and the flow returns to the process in step S31 (Nmm→Nmm+1). In other words, the processes in steps S31 to S38 are repeatedly executed by increasing the case number Nmm until a positive determination result is obtained in the process in step S33.

When it is determined that the number of changes $N_{CH\_FB}$ or $N_{CH\_FF}$ reaches the upper limit in a process in step S38, an optimal combination of the case number Nmm and the target segment TSi is selected (step S39). The optimal combination is made by selecting a case number Nmm in which the absolute value of the difference between the delivery side temperature prediction value $T_{CT}^{CAL}$ (Nmm) and the delivery side temperature target value $T_{CT}^{AIM}$ is the smallest from among the case numbers Nmm stored in the memory by the process in step S34.

2-2-2. When Water Injection Amount is Approaching Minimum Water Injection Amount In the routine shown in FIG. 13, the case number Nmm is set first (step S40). A content of a process in step S40 is basically the same as that of the process in step S30 shown in FIG. 12. However, the initial values $N_{CH\_FF}^{INI}$ and $N_{CH\_FB}^{INI}$ are expressed by Expressions (17) and (18).

$$N_{CH\_FB} = N_{CH\_FB}^{INI} \tag{17}$$

$$N_{CH\_FF} = -1 \cdot N_{CH\_FF}^{INI} \tag{18}$$

An upper limit $N_{CH\_FB}^{MAX\_Inc}$ of the number of changes $N_{CH\_FB}$ at a time of increasing the number of valves in the FB bank is set in advance. For example, it is assumed that four valves can be opened at maximum by one change (that is, $N_{CH\_FB}^{MAX\_Inc} = 4$). On the other hand, an upper limit $N_{CH\_FF}^{MAX\_Dec}$ of the number of changes $N_{CH\_FF}$ at a time of decreasing the number of valves in the FF bank is set to a number of valves in an open state and usable in a present condition (that is, valves changeable to a closed state by transfer) according to a cooling pattern.

In the process in step S40, transfer valves are further determined according to the cooling pattern. A case in which the cooling pattern is front-stage cooling is considered. In this case, the transfer valve is a valve located most downstream (that is, a valve of the FF bank that is closest to the delivery side of the cooling facility 12) among valves in an open state and usable in the present condition, of the FF bank. When the number of changes $N_{CH\_FB}$ is two or more, two or more valves of the transfer bank correspond to the transfer valves.

Subsequently to the process in step S40, the target segment TSi is determined (step S41). When a certain valve in the FF bank is closed, there is a valve response delay until a water injection amount of the valve actually changes. Therefore, in a process in step S41, in order to perform early transfer, the segment Si that firstly passes through the position of the transfer valve is predicted, when the water injection amount changes by closing the transfer valve. The segment Si is set to be the target segment TSi.

Subsequently to the process in step S41, processes in steps S42 to S45 are performed. Contents of the processes in steps S42 and S43 are the same as those in steps S32 to S35 shown in FIG. 12.

In a process in step S45, a negative sign of the difference means that the delivery side temperature prediction value $T_{CT}^{CAL}$ (Nmm) is lower than the delivery side temperature target value $T_{CT}^{AIM}$. Therefore, it is considered to increase the number of valves in a closed state, of the FB bank, but the water injection amount in the FB bank approaches the minimum water injection amount. Thus, when it is determined that the sign of the difference is negative, the number of transfer valves (valves that are switched to a closed state from an open state) in the FF bank is increased by one (the number of changes $N_{CH\_FF} \rightarrow$ the number of changes $N_{CH\_FF}+1$) (step S46). Thereby, the water injection amount in the transfer bank decreases, such that the delivery side temperature prediction value $T_{CT}^{CAL}$ (Nmm) rises.

On the other hand, a positive sign of the difference means that the delivery side temperature prediction value $T_{CT}^{CAL}$ (Nmm) is higher than the delivery side temperature target value $T_{CT}^{AIM}$. Thus, when it is determined that the sign of the difference is positive, the number of valves in an open state, of the FB bank is increased by one (the number of changes $N_{CH\_FB} \rightarrow$ the number of changes $N_{CH\_FB}+1$) (step S47). Thereby, the water injection amount in the FB bank increases, and therefore, the delivery side temperature prediction value $T_{CT}^{CAL}$ (Nmm) decreases.

Subsequently to the process in step S46 or S47, it is determined whether or not the number of changes $N_{CH\_FB}$ or $N_{CH\_FF}$ reaches the upper limit (step S48). A process in step S48 is performed depending on whether or not condition (19) or (20) is satisfied.

$$abs(N_{CH\_FB}) > N_{CH\_FB}^{MAX\_Inc} \tag{19}$$

$$abs(N_{CH\_FF}) > N_{CH\_FF}^{MAX\_Dec} \tag{20}$$

When it is determined that the number of changes $N_{CH\_FB}$ or $N_{CH\_FF}$ does not reach the upper limit in the process in step S48, the case number Nmm is increased by one and the flow returns to the process in step S41 (Nmm→Nmm+1). In other words, the processes in step S41 to S48 are repeatedly executed while increasing the case number Nmm until a positive determination result is obtained in the process in step S43.

When it is determined that the number of changes $N_{CH\_FB}$ or $N_{CH\_FF}$ reaches the upper limit in the process in step S48, an optimal combination of the case number Nmm and the target segment TSi is selected (step S49). A content of a process in step S49 is the same as that of the process in step S39 shown in FIG. 12.

2-3. Effect

According to the second embodiment, it becomes possible to control the actual temperature of the segment Si including the target segment TSi to the target temperature while preventing the water injection amount in the FB bank from becoming the maximum water injection amount or the minimum water injection amount.

REFERENCE SIGNS LIST

10 Run out table (ROT)
12 Cooling facility
13 Entry side pyrometer
14 Delivery side pyrometer
20, 30 Control device
21 Preset calculation unit
22 Cooling history management unit
23 Feedforward calculation unit
24 Recalculation unit
25 Feedback calculation unit
26 Feedback controller
27 Control target
28 Smith compensator
M strip (material to be rolled)
S, Si, Sj, Sk, Sm Segment
SP Recalculation position
$T_{CT}^{ACT}$ Delivery side temperature actual value
$T_{CT}^{AIM}$ Delivery side temperature target value
$T_{CT}^{CAL}$ Delivery side temperature prediction value
$T_{FDT}^{CAL}$ Entry side temperature prediction value
dT Temperature drop prediction value
$dT^{actcal}$ Temperature drop actual value

The invention claimed is:

1. A control device for a cooling apparatus that is provided at a rolling line and is configured to cool a material to be rolled by a plurality of cooling banks, wherein the control device is configured to control each of water injection amounts in the plurality of cooling banks such that a delivery side temperature target value indicating a target temperature of the material to be rolled at a position of a delivery side pyrometer provided at a delivery side of the cooling apparatus corresponds to a delivery side temperature actual value indicating an actual temperature of the material to be rolled that is measured by the delivery side pyrometer, wherein, in the control of each of the water injection amounts in the plurality of cooling banks, the control device is configured to perform preset calculation, cooling history management, feedforward calculation, and feedback calculation, wherein, in the preset calculation, the control device is configured to:

set each of the plurality of cooling banks to be a feedforward bank for performing feedforward control of the water injection amount, or a feedback bank for performing feedback control of the water injection amount, the feedback bank being at least one cooling bank that is allocated in order from a downstream side in the rolling line according to the material to be rolled, the feedforward bank being a remaining cooling bank;

calculate a delivery side temperature prediction value indicating a predicted temperature of the material to be rolled at the position of the delivery side pyrometer; and calculate each of the water injection amounts in the plurality of cooling banks such that the delivery side temperature prediction value corresponds to the delivery side temperature target value, wherein, in the cooling history management, the control device is configured to:

grasp a position of the material to be rolled for each of segments indicating one section at a time of dividing the material to be rolled into a virtual length in a conveyance direction; and store a cooling history including an actual speed of the material to be rolled at each of positions of the plurality of cooling banks, and a history of each of the water injection amounts in the plurality of cooling banks, for each of the segments, wherein, in the feedforward calculation, the control device is configured to:

calculate the delivery side temperature prediction value for each of the segments, based on an entry side temperature actual value indicating an actual temperature of the material to be rolled at a position of an entry side pyrometer provided at an entry side of the cooling apparatus, and a speed of the material to be rolled at the position of the entry side pyrometer; and change each of the water injection amounts in the feedforward banks that are calculated in the preset calculation, based on a difference between the delivery side temperature target value, and the delivery side temperature prediction value calculated for each of the segments, wherein, in the feedback calculation, the control device is configured to calculate a difference between the delivery side temperature actual value and the delivery side temperature target value for each of the segments, wherein, in the cooling history management, the control device is further configured to set a recalculation position for re-executing the feedback calculation, the re-calculation position being located at an upstream side in the rolling line from a position of the feedback bank by a distance corresponding to a response delay of the feedback bank, wherein, when a segment reaches the recalculation position, the control device is further configured to perform recalculation of the delivery side temperature prediction value for the segment that reaches the recalculation position, based on the cooling history, and wherein, in the feedback calculation, the control device is further configured to:

when the segment reaches the recalculation position, calculate a temperature correction value for compensating a delay due to a conveyance time period from the position of the feedback bank to the position of the delivery side pyrometer, and a response delay of the feedback bank; and change each water injection amount in the feedback bank calculated in the preset calculation for each of the segments, based on the delivery side temperature target value, the delivery side temperature actual value calculated for each of the segments, the recalculated delivery side temperature prediction value, and the temperature correction value.

2. The control device for a cooling apparatus according to claim 1, wherein the control device is further configured to perform a calculation of a predicted speed of the material to be rolled, wherein, in the recalculation, the control device is configured to:

calculate a temperature drop actual value of the material to be rolled that is conveyed from the position of the entry side pyrometer to the recalculation position for each of the segments, based on the cooling history from the position of the entry side pyrometer to the recalculation position;

calculate a temperature drop prediction value of the material to be rolled from the recalculation position to the position of the delivery side pyrometer for each of the segments, based on the predicted speed, and each of the water injection amounts in the plurality of cooling banks obtained by the preset calculation; and calculate the delivery side temperature prediction value, based on the temperature drop actual value, and the temperature drop prediction value.

3. The control device for a cooling apparatus according to claim 2, wherein a predetermined cooling pattern is applied to each of the water injection amounts in the feedforward banks, wherein, in the feedforward calculation, the control device is configured to change each of the water injection amounts in the feedforward banks within a range of the predetermined cooling pattern.

4. The control device for a cooling apparatus according to claim 3, wherein a predetermined cooling pattern is applied to each of the water injection amounts in the feedforward banks, wherein the control device is further configured to:

perform determination of whether or not the water injection amount in the feedback bank approaches a maximum water injection amount or a minimum water injection amount, for each of the feedback banks; and transfer water injection or stop of water injection in the feedback bank to the feedforward banks within a range of the predetermined cooling pattern, when it is determined that the water injection amount in the feedback bank approaches the maximum water injection amount or the minimum water injection amount.

5. The control device for a cooling apparatus according to claim 2, wherein a predetermined cooling pattern is applied to each of the water injection amounts in the feedforward banks, wherein the control device is further configured to:

perform determination of whether or not the water injection amount in the feedback bank approaches a maximum water injection amount or a minimum water injection amount, for each of the feedback banks; and transfer water injection or stop of water injection in the feedback bank to the feedforward banks within a range of the predetermined cooling pattern, when it is determined that the water injection amount in the feedback bank approaches the maximum water injection amount or the minimum water injection amount.

6. The control device for a cooling apparatus according to claim 1, wherein a predetermined cooling pattern is applied to each of the water injection amounts in the feedforward banks, wherein, in the feedforward calculation, the control device is configured to change each of the water injection amounts in the feedforward banks within a range of the predetermined cooling pattern.

7. The control device for a cooling apparatus according to claim 6, wherein a predetermined cooling pattern is applied to each of the water injection amounts in the feedforward banks, wherein the control device is further configured to:

perform determination of whether or not the water injection amount in the feedback bank approaches a maximum water injection amount or a minimum water injection amount, for each of the feedback banks; and transfer water injection or stop of water injection in the feedback bank to the feedforward banks within a range of the predetermined cooling pattern, when it is determined that the water injection amount in the feedback bank approaches the maximum water injection amount or the minimum water injection amount.

8. The control device for a cooling apparatus according to claim 1, wherein a predetermined cooling pattern is applied to each of the water injection amounts in the feedforward banks, wherein the control device is further configured to:

perform determination of whether or not the water injection amount in the feedback bank approaches a maximum water injection amount or a minimum water injection amount, for each of the feedback banks; and transfer water injection or stop of water injection in the feedback bank to the feedforward banks within a range of the predetermined cooling pattern, when it is determined that the water injection amount in the feedback bank approaches the maximum water injection amount or the minimum water injection amount.

* * * * *